(12) United States Patent
Harrelson

(10) Patent No.: US 10,507,413 B2
(45) Date of Patent: Dec. 17, 2019

(54) FILTER END CAP

(71) Applicant: MANN+HUMMEL Filtration Technology Group Inc., Gastonia, NC (US)

(72) Inventor: David Brent Harrelson, Mt. Holly, NC (US)

(73) Assignee: MANN+HUMMEL Filtration Technology Group Inc., Gastonia, NC (US)

(*) Notice: Subject to any disclaimer, the term of this patent is extended or adjusted under 35 U.S.C. 154(b) by 170 days.

(21) Appl. No.: 15/408,195

(22) Filed: Jan. 17, 2017

(65) Prior Publication Data

US 2018/0200651 A1   Jul. 19, 2018

(51) Int. Cl.
| | |
|---|---|
| *B01D 29/11* | (2006.01) |
| *B01D 35/00* | (2006.01) |
| *B01D 35/30* | (2006.01) |
| *B01D 27/08* | (2006.01) |
| *B01D 29/15* | (2006.01) |

(52) U.S. Cl.
CPC .......... *B01D 35/306* (2013.01); *B01D 27/08* (2013.01); *B01D 29/15* (2013.01); *B01D 2201/291* (2013.01); *B01D 2201/295* (2013.01)

(58) Field of Classification Search
CPC .. B01D 29/114; B01D 35/306; B01D 35/005; B01D 2201/291
USPC .............................................. 210/493.2, 450
See application file for complete search history.

(56) References Cited

U.S. PATENT DOCUMENTS

| | | |
|---|---|---|
| 3,231,089 A | 1/1966 | Thornton |
| 3,339,738 A | 9/1967 | Wilhelm |
| 3,473,664 A | 10/1969 | Hultgren |
| 3,567,022 A | 3/1971 | Thornton et al. |
| 3,608,724 A | 9/1971 | Baldwin |
| 3,633,750 A | 1/1972 | Braun et al. |
| 3,722,683 A | 3/1973 | Shaltis et al. |
| 3,724,665 A | 4/1973 | Hall |
| 3,774,764 A | 11/1973 | Baldwin |
| 3,822,787 A | 7/1974 | Shaltis et al. |
| 4,075,097 A | 2/1978 | Paul |
| 4,075,098 A | 2/1978 | Paul et al. |
| 4,265,748 A | 5/1981 | Villani et al. |

(Continued)

FOREIGN PATENT DOCUMENTS

| | | |
|---|---|---|
| CN | 2921302 Y | 7/2007 |
| EP | 1245261 A1 | 10/2002 |

(Continued)

OTHER PUBLICATIONS

International Search Report and Written Opinion for the related application No. PCT/US2018/013936 dated Aug. 9, 2018.

*Primary Examiner* — Madeline Gonzalez
(74) *Attorney, Agent, or Firm* — Honigman LLP

(57) ABSTRACT

An apparatus configured to engage a filter housing and an end of filter media includes an endcap and at least one biasing portion. The endcap includes a first axial surface, a second axial surface arranged opposite said first axial surface, and an outer radial surface transverse to the first and second axial surfaces. The first axial surface is configured to engage the end of the filter media. The at least one biasing portion includes a proximal end integrally formed with the endcap, and a distal end extending radially outward of the outer radial surface.

30 Claims, 18 Drawing Sheets

(56) References Cited

U.S. PATENT DOCUMENTS

| | | | |
|---|---|---|---|
| 4,314,903 A | 2/1982 | Hanley | |
| 4,400,864 A | 8/1983 | Peyton et al. | |
| 4,497,706 A | 2/1985 | Pickett et al. | |
| 4,557,829 A | 12/1985 | Fields | |
| 5,037,539 A | 8/1991 | Hutchins et al. | |
| 5,256,280 A | 10/1993 | Anderly et al. | |
| 5,462,679 A | 10/1995 | Verdegan et al. | |
| 6,391,193 B1 * | 5/2002 | Luka | B01D 27/06 210/130 |
| 6,544,412 B2 | 4/2003 | Michels et al. | |
| 6,585,887 B2 | 7/2003 | Michels et al. | |
| 6,740,236 B2 | 5/2004 | Rickle et al. | |
| 7,175,761 B2 | 2/2007 | Stanhope et al. | |
| 2004/0108257 A1 | 6/2004 | Morton | |
| 2005/0103692 A1 | 5/2005 | Stanhope et al. | |
| 2005/0194312 A1 * | 9/2005 | Niemeyer | B01D 27/08 210/634 |
| 2006/0201858 A1 | 9/2006 | Gaither | |
| 2006/0219626 A1 * | 10/2006 | Dworatzek | B01D 27/08 210/443 |
| 2007/0163946 A1 | 7/2007 | Attassery et al. | |
| 2012/0193275 A1 | 8/2012 | Kim | |

FOREIGN PATENT DOCUMENTS

| | | |
|---|---|---|
| GB | 978517 A | 12/1964 |
| GB | 2054400 A | 2/1981 |
| JP | 2000225305 A | 8/2000 |
| JP | 2009267006 A | 11/2009 |
| WO | WO-2015072874 A1 | 5/2015 |

* cited by examiner

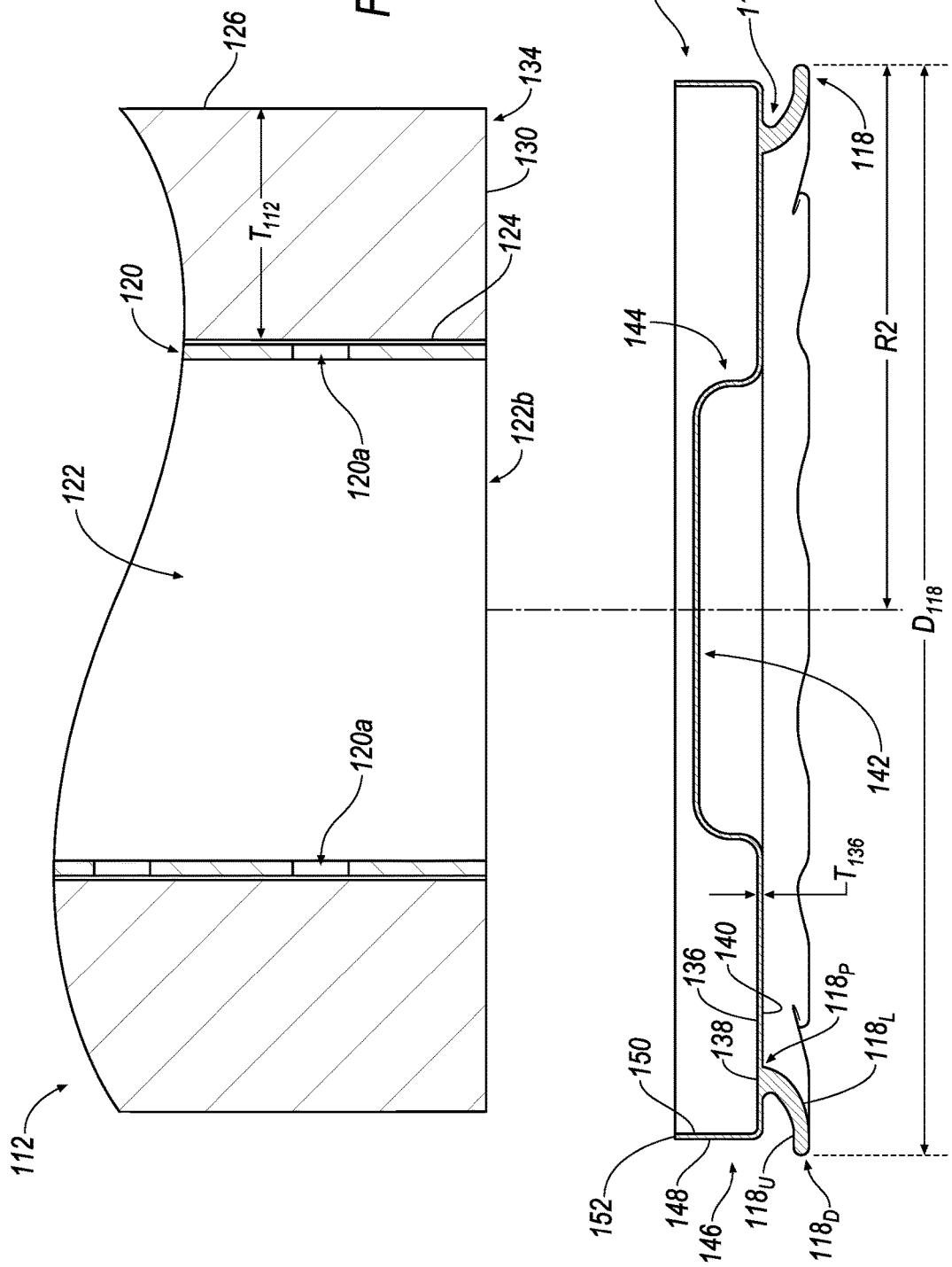

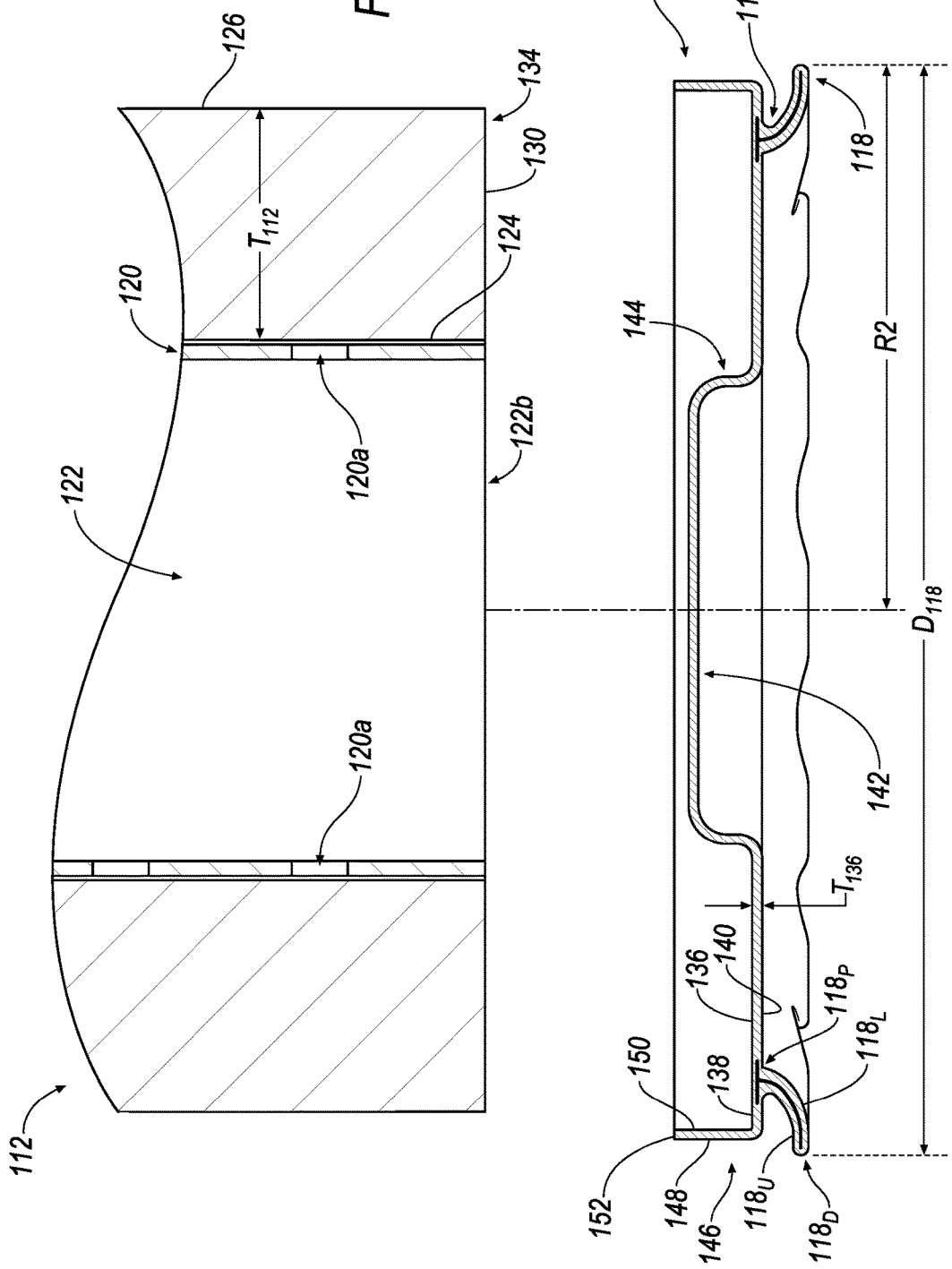

FILTER END CAP

TECHNICAL FIELD

This disclosure relates to a filter end cap and a filter assembly including a filter end cap.

BACKGROUND

Various filters are known in the art for filtering fluid as it passes through a fluid path. Filters include, in part, filter media which removes impurities from a fluid, such as, for example, oil or fuel that passes through filter media.

In most applications, either a filter assembly or the filter media associated therewith must be periodically replaced to reduce the potential of developing unacceptably high impedance in the fluid path flow restriction.

While known filters have proven to be acceptable for various applications, such conventional filters are nevertheless susceptible to improvements that may enhance their overall performance and cost. Therefore, a need exists to develop improved filters and methodologies for forming the same that advance the art.

SUMMARY

One aspect of the disclosure provides an apparatus configured to engage a filter housing and an end of filter media. The apparatus may include an endcap and at least one biasing portion. The endcap may include a first axial surface, a second axial surface arranged opposite said first axial surface, and an outer radial surface transverse to the first and second axial surfaces. The first axial surface may be configured to engage the end of the filter media. The at least one biasing portion may include a proximal end integrally formed with the endcap, and a distal end extending radially outward of the outer radial surface.

Implementations of the disclosure may include one or more of the following optional features. For example, the end cap and the plurality of filter housing-engaging portions may be formed from one material. In some implementations, the material is metal or plastic.

In some examples, the end cap and the at least one biasing portion are formed from a first material and a second material.

In some implementations, the first material includes one of metal and plastic. The second material may include the other of metal and plastic.

In some examples, the second material forms a core member of each biasing portion extends along at least a portion of a length of each biasing portion of the plurality of biasing portions. The first material may form an outer body that is formed over the second material such that the first material defines at least a portion of both of the end cap and the plurality of biasing portions.

In some implementations, the second material further extends from the portion of the length of each biasing portion of the plurality of biasing portions and into a portion of a thickness of the annular body of the end cap.

In some examples, the body is an annular body. The first axial surface may be an upper axial surface. The second axial surface may be a lower axial surface.

In some implementations, the plurality of biasing portions integrally extend from the lower axial surface of the annular body of the end cap.

In some examples, the plurality of biasing portions include six biasing portions.

In some implementations, each adjacent biasing portion of the plurality of biasing portions are angularly offset at an angle approximately equal to 60°.

In some examples, the plurality of biasing portions includes fourteen biasing portions.

In some implementations, each adjacent biasing portion of the plurality of biasing portions are angularly offset at an angle approximately equal to 25°.

In some examples, each biasing portion of the plurality of biasing portions is defined by a proximal end, a distal end, an upper axial surface, a lower axial surface, a first side surface and a second side surface.

In some implementations, the proximal end of each biasing portion of the plurality of biasing portions integrally extends from the lower axial surface of the annular body of the end cap.

In some examples, each biasing portion of the plurality of biasing portions is defined by a sinusoidal shape having a concave portion and a convex portion.

In some implementations, the concave portion includes a proximal end and a distal end. The convex portion may include a proximal end and a distal end. The proximal end of the concave portion may be integral with and extend directly away from the lower axial surface of the annular body of the end cap. The proximal end of the convex portion may be integral with and extend directly away from the distal end of the concave portion. The distal end of the convex portion may be a terminal end of each biasing portion. The proximal end of the concave portion of each biasing portion may be the proximal end of each biasing portion of the plurality of biasing portions. The distal end of the convex portion of each biasing portion may be the distal end of each biasing portion of the plurality of biasing portions.

In some examples, at least a portion of the upper axial surface of each biasing portion of the plurality of biasing portions includes a deflection limiting portion. The deflection limiting portion may be defined by a length that extends along at least a portion of a length of each biasing portion of the plurality of biasing portions.

In some implementations, the length of each deflection limiting portion extends along at least a portion of a length of the concave portion of each biasing portion of the plurality of biasing portions.

In some examples, the deflection limiting portion is further defined by a width and a thickness. The width of each deflection limiting portion may be approximately equal to about half of a width of each biasing portion of the plurality of biasing portions. The thickness of each deflection limiting portion may be defined by a non-constant thickness that tapers along the length of each deflection limiting portion as each deflection limiting portion extends along at least the portion of the length of the concave portion of each biasing portion of the plurality of biasing portions.

In some implementations, the thickness of each deflection limiting portion defined by the non-constant thickness includes a maximum thickness near the proximal end of the concave portion of each biasing portion of the plurality of biasing portions and a minimum thickness near the distal end of the concave portion of each biasing portion of the plurality of biasing portions.

In some examples, a circumferential skirt portion extends axially away from the upper axial surface. The circumferential skirt portion may be defined by an outer radial surface, an inner radial surface and an axial surface connecting the outer radial surface to the inner radial surface.

In some implementations, the plurality of biasing portions are circumferentially arranged about the lower axial surface of the annular body of the end cap. The proximal end of each biasing portion of the plurality of biasing portions may each be equally radially spaced away from an axial center of the end cap at a first radial distance. The distal end of each biasing portion of the plurality of biasing portions may each be equally radially spaced away from the axial center of the end cap at a second radial distance. The second radial distance may extend radially beyond the outer radial surface of the circumferential skirt portion.

In some examples, the proximal end of each biasing portion of the plurality of biasing portions integrally extends from a ring portion that integrally extends from the lower axial surface of the annular body of the end cap.

In some implementations, the first side surface and the second side surface of each biasing portion of the plurality of biasing portions is defined by a generally arcuate shape such that a first side surface of a biasing portion connected to a second side surface of an adjacent biasing portion collectively defines a concave surface.

In some examples, the annular body is defined by a thickness extending between the upper axial surface and the lower axial surface.

In some implementations, the annular body does not form a passage extending through the thickness extending between the upper axial surface and the lower axial surface.

In some examples, the lower axial surface of the annular body of the end cap defines an annular-shaped depressed portion that forms an annular-shaped boss extending from the upper axial surface of the annular body of the end cap.

Another aspect of the disclosure provides a filter assembly. The filter assembly may include a tube-shaped body of filter media, an upper end cap and a lower end cap. The tube-shaped body of filter media may be defined by an inner radial surface, an outer radial surface, an upper axial surface and a lower axial surface. The inner radial surface may define a passage extending through the tube-shaped body of filter media. The upper end cap may be disposed adjacent the upper axial surface of the tube-shaped body of filter media. The lower end cap may be a lower end cap disposed adjacent the lower axial surface of the tube-shaped body of filter media. The end cap may include a body defined by a first axial surface and a second axial surface arranged opposite the first axial surface. A plurality of biasing portions may integrally extend from the second axial surface of the body of the end cap.

Implementations of the disclosure may include one or more of the following optional features. For example, the plurality of biasing portions integrally extends from the second axial surface of the body of the end cap may be sized and positioned relative the lower end cap for arrangement adjacent an inner surface defining a cavity of a filter housing such that the plurality of biasing portions biases the filter assembly away from the inner surface of the filter housing at an axial distance.

In some implementations, the body of the lower end cap may be defined by a thickness extending between the upper surface of the lower end cap and the lower surface of the lower end cap.

In some examples, the body of the lower end cap does not form a passage extending through the thickness.

In some implementations, the lower surface of the body of the end lower cap defines an annular-shaped depressed portion that forms an annular-shaped boss extending from the upper surface of the body of the lower end cap. An inner radial surface of the annular-shaped boss may be arranged opposite or adjacent the outer radial surface of the tube-shaped body of the filter media.

In some examples, the annular-shaped boss is at least partially registered within the passage formed by a lower end of the tube-shaped body of filter media by way of a lower passage formed by the lower axial surface of the tube-shaped body of filter media when the upper surface of the lower end cap is disposed adjacent the lower axial surface of the tube-shaped body of the filter media.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 12A is an exploded cross-sectional view of filter media and an exemplary end cap of the filter assembly of FIG. 9.

FIG. 12B is an exploded cross-sectional view of filter media and an exemplary end cap of the filter assembly of FIG. 9.

DETAILED DESCRIPTION

A filter assembly includes, in part, filter media which removes impurities from a fluid, such as, for example, oil or fuel that passes through filter media. The filter assembly also includes an upper end cap and a lower end cap. The lower end cap integrally includes a plurality of biasing portions that exert a spring force when the filter assembly is secured within a housing such that the lower end cap may axially bias the filter assembly away from an inner surface of the housing at an axial distance.

Figure 1A:
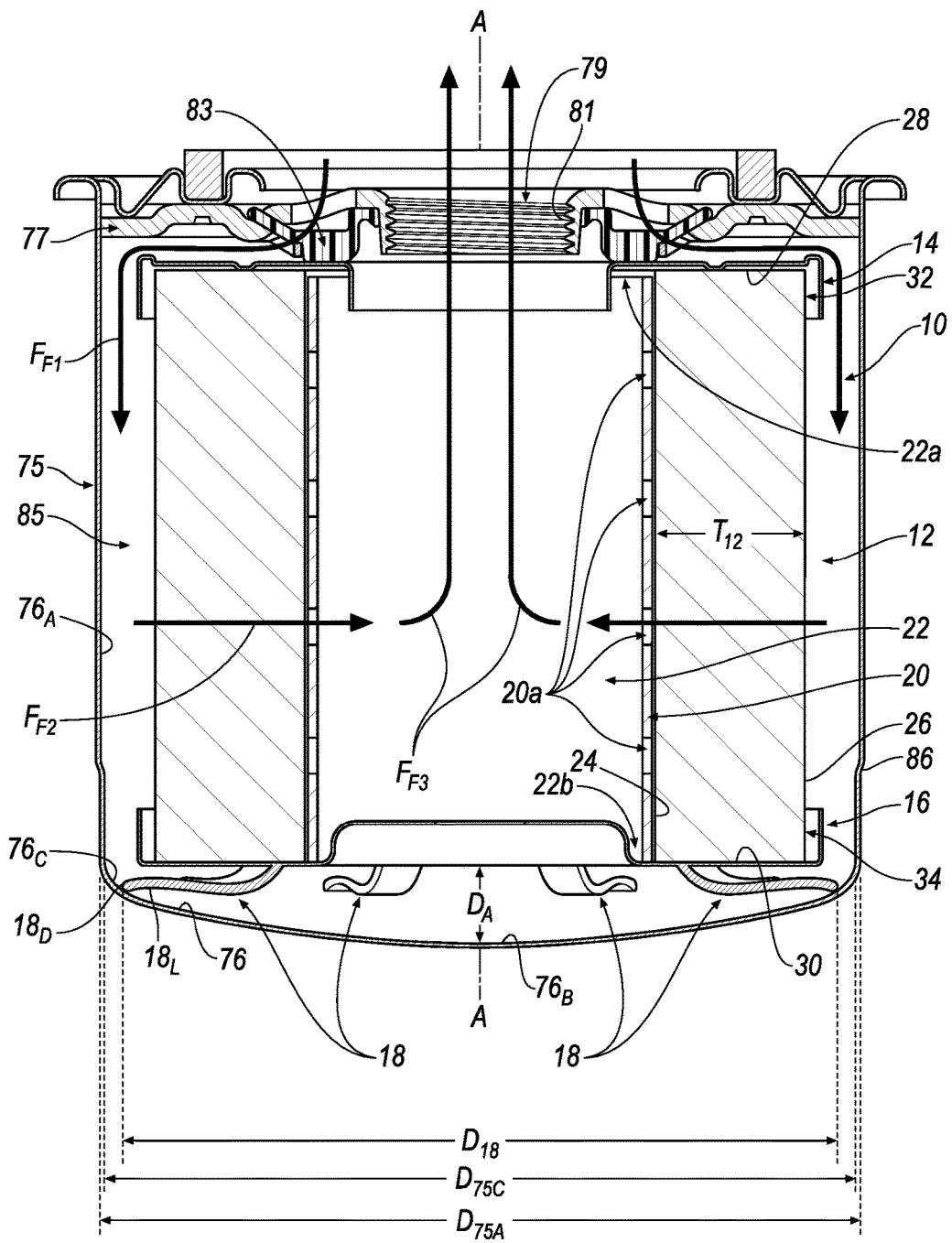
FIG. 1A is a cross-sectional view of an exemplary filter assembly disposed within a housing.
Figure 2:
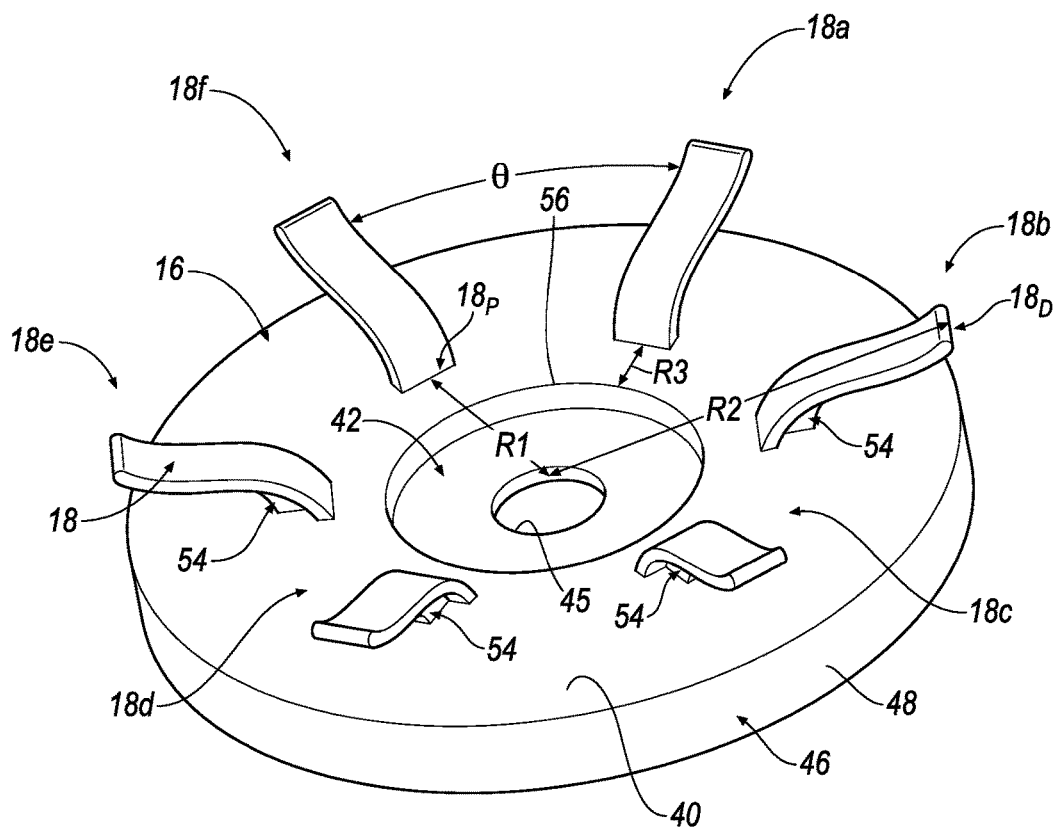
FIG. 2 is a perspective view of an exemplary end cap of the filter assembly of FIG. 1A.
Figure 3:
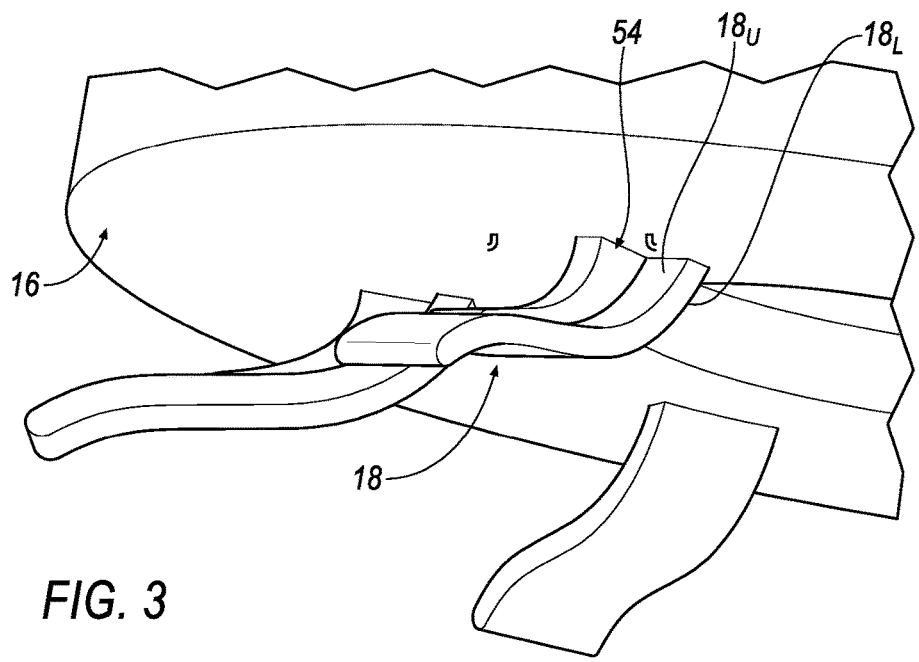
FIG. 3 is an enlarged, partial perspective view of an exemplary end cap of the filter assembly of FIG. 1A.
Figure 4A:
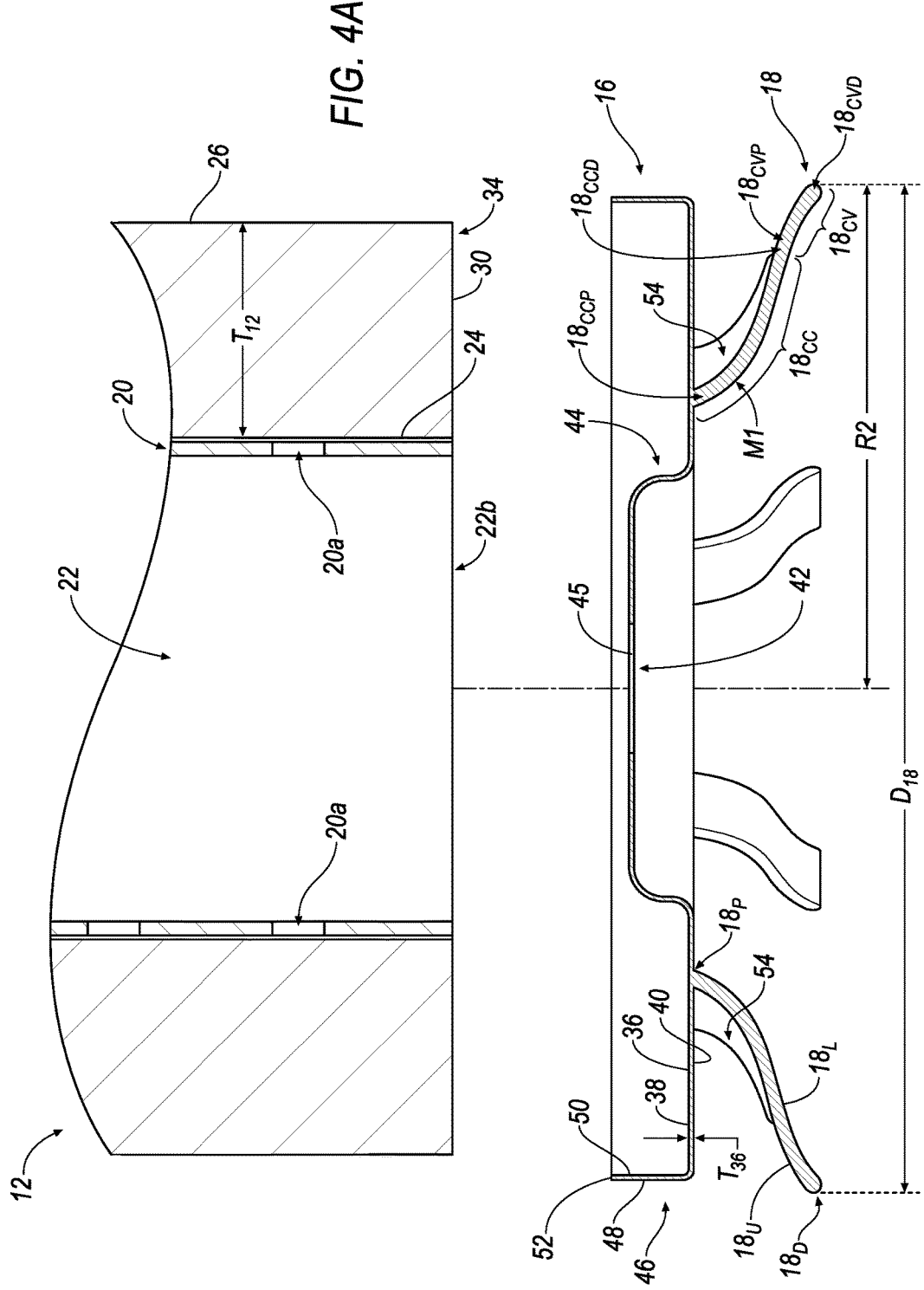
FIG. 4A is an exploded cross-sectional view of filter media and an exemplary end cap of the filter assembly of FIG. 1A.
Figure 4B:
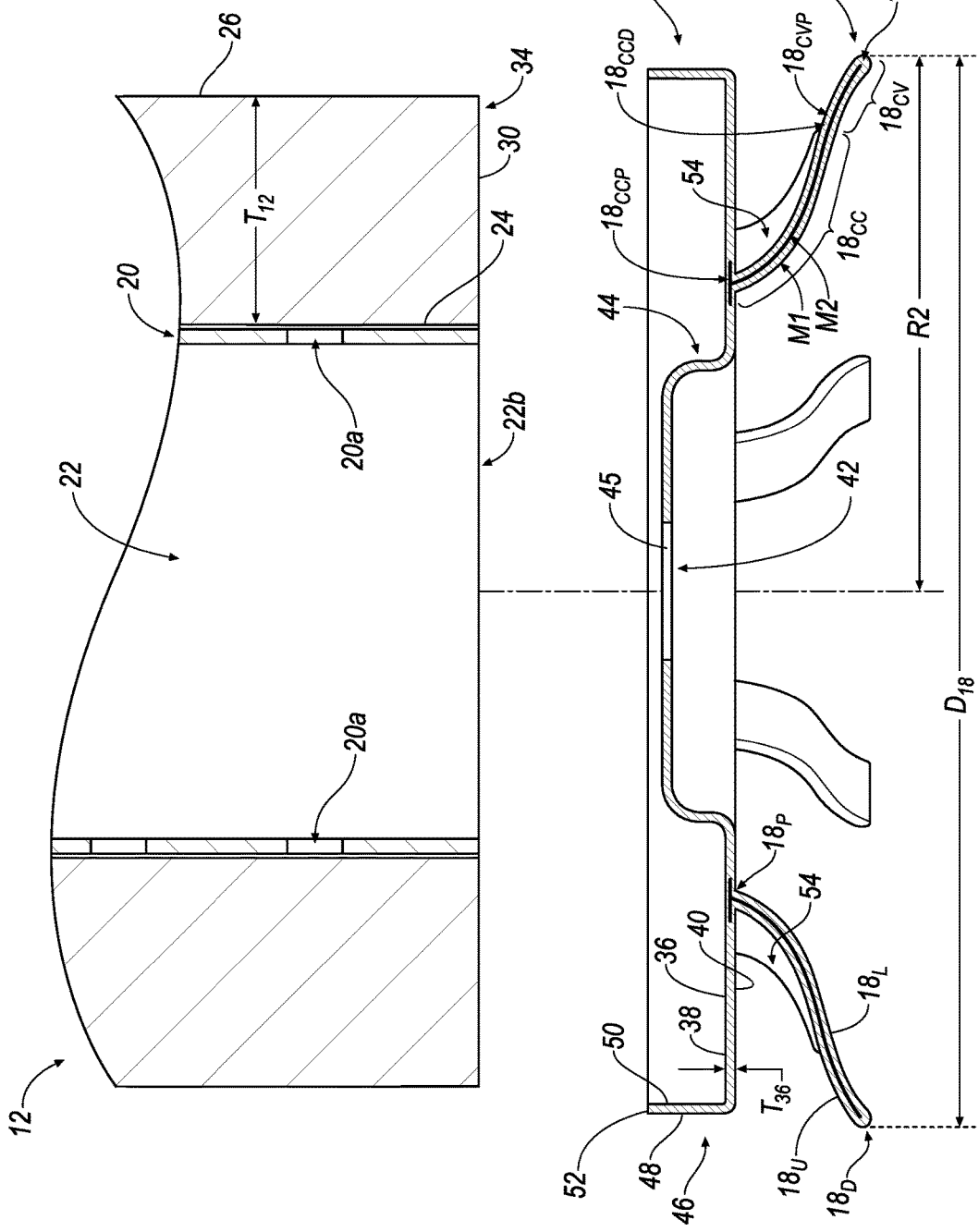
FIG. 4B is an exploded cross-sectional view of filter media and an exemplary end cap of the filter assembly of FIG. 1A.

Referring to FIG. 1A, an exemplary filter assembly is shown generally at 10. The filter assembly 10 includes filter media 12, an upper end cap 14 and a lower end cap 16. As seen in FIGS. 1-3, a plurality of biasing portions 18 integrally extend from the lower end cap 16. In this regard, one or more of the biasing portions 18 may be integrally and/or monolithically formed with the lower end cap 16. Referring to FIGS. 4A-5B, in some examples, the lower end cap 16 that integrally includes the plurality of biasing portions 18 may be made from any desirable material M1, M2 (e.g., a plastic material, a metal material or the like). The material(s) M1, M2 defining the lower end cap 16 including the plurality of biasing portions 18 may be made from a flexible material that is capable of imparting a spring force. The spring force may be imparted by the plurality of biasing portions 18 when the plurality of biasing portions 18 axially engage and are axially pushed toward a surface (such as, e.g., an inner surface 76 (see, e.g., FIG. 1A) of a housing 75 that contains the filter assembly 10) such that the lower end cap 16 axially biases the filter assembly 10 away from the surface 76 that the plurality of biasing 18 engage at an axial distance $D_A$ (see, e.g., FIG. 1A). In this regard, the biasing portions 18 may be referred to herein as "filter housing-engaging portions" and/or "filter housing-engaging portions 18."

As seen in FIG. 1A, the filter media 12 may include any desirable geometry such as, for example, a tube-shaped body. The filter assembly 10 may optionally include a center tube 20 disposed within a passage 22 defined by the tube-shaped body of the filter media 12. The passage 22 is defined by an inner radial surface 24 of the tube-shaped body of the filter media 12. The tube-shaped body of the filter media 12 is also defined by an outer radial surface 26, an upper axial surface 28 and a lower axial surface 30. Access to the passage 22 is permitted by an upper opening 22a formed by the upper axial surface 28 or a lower opening 22b formed by the lower axial surface 30.

Both of the upper axial surface 28 and the lower axial surface 30 connect the inner radial surface 24 to the outer radial surface 26. The upper axial surface 28 and a portion of each of the inner radial surface 24 and the outer radial surface 26 extending from the upper axial surface 28 generally defines an upper end 32 of the tube-shaped body. The lower axial surface 30 and a portion of each of the inner radial surface 24 and the outer radial surface 26 extending from the lower axial surface 30 generally defines a lower end 34 of the tube-shaped body of the filter media 12.

The center tube 20 may be disposed within the passage 22 and directly adjacent the inner radial surface 24 of the tube-shaped body of the filter media 12. Functionally, the center tube 20 may rigidify the tube-shaped body of the filter media 12. The center tube 20 may also include a plurality of radial passages 20a. The plurality of radial passages 20a permit radial fluid flow (see, e.g., fluid-flow path $F_{F2}$): (1) from the outer radial surface 26 of the tube-shaped body of the filter media 12; (2) through a radial thickness dimension $T_{12}$ of the tube-shaped body of the filter media 12; (3) out of the inner radial surface 24 of the tube-shaped body of the filter media 12; (4) through the plurality of radial passages 20a of the center tube 20; and (5) into the passage 22 formed by the tube-shaped body of the filter media 12.

Referring to FIG. 1A, the filter assembly 10 is shown disposed within a housing 75. The housing 75 includes the nutplate 77 having an axial passage 79 defined by a threaded surface 81. The axial passage 79 may define an anti-drain back valve of the nutplate 77. In some implementations, the upper end cap 14 is connected to a portion 83 (e.g., the anti-drain back valve) of the nutplate 77 in a fluidly-sealed relationship. In other implementations, the upper end cap 14 may engage a support portion (not shown) of the housing 75, and not be supported by the portion 83 of the nutplate 77. As described above, the plurality of filter housing-engaging portions 18 of the lower end cap 16 imparts a spring force when the plurality of filter housing-engaging portions 18 axially engage and are axially pushed toward the inner surface 76 of the housing 75 such that the lower end cap 16 axially biases the filter assembly 10 away from the surface 76 at an axial distance $D_A$.

When the housing 75 is connected to an engine mount head (not shown) by the threaded surface 81, a fluid is permitted to flow: (1) from the engine mount head and into a void (see fluid-flow path $F_{F1}$) between the inner surface 76 of the housing 75 and the filter assembly 10; (2) through (see fluid-flow path $F_{F2}$) the filter assembly 10; and out of (see fluid-flow path $F_{F3}$) the filter assembly 10 back to the engine mount head. The fluid-flow path shown generally at $F_{F1}$ defines a flow path of an unfiltered fluid flowing within the housing 75 and toward the outer radial surface 26 of the tube-shaped body of the filter media 12. The fluid-flow path shown generally at $F_{F2}$ defines a flow path of the unfiltered fluid flowing through the tube-shaped body of the filter media 12 from the outer radial surface 26 of the tube-shaped body of the filter media 12 to the inner radial surface 24 of the tube-shaped body of filter media 12; by permitting the unfiltered fluid to flow through the tube-shaped body of filter media 12, impurities are removed from the fluid such that the fluid emerging from the inner radial surface 24 of the tube-shaped body of filter media 12 is no longer unfiltered fluid, but, rather, filtered fluid. The fluid-flow path shown generally at $F_{F3}$ defines filtered fluid flowing from the inner radial surface 24 of the tube-shaped body of the filter media 12 and into the passage 22 defined by the inner radial surface 24 of the tube-shaped body of the filter media 12.

Figure 5A:
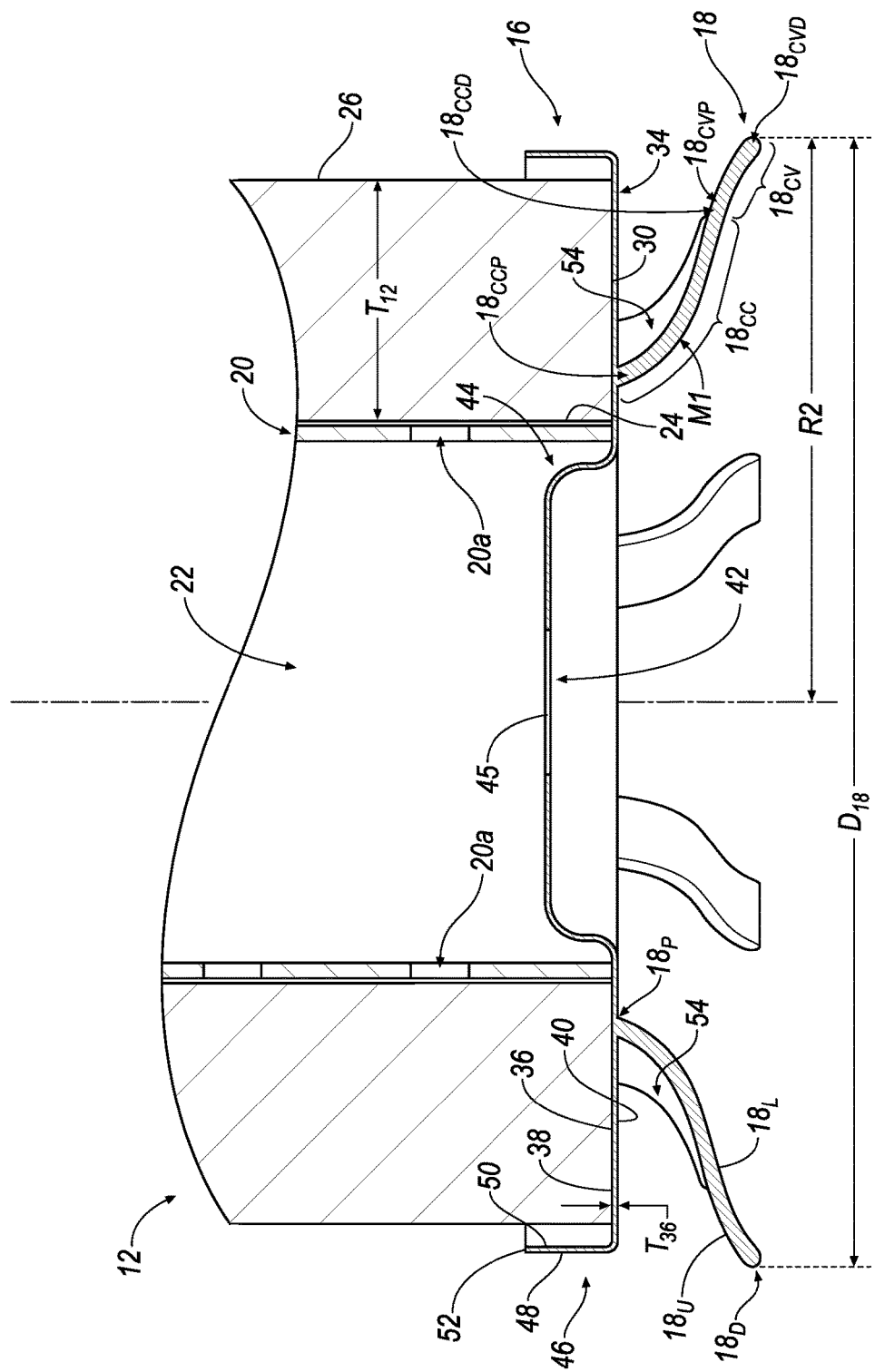
FIG. 5A is an assembled cross-sectional view of the filter media and the exemplary end cap of FIG. 4A.
Figure 5B:
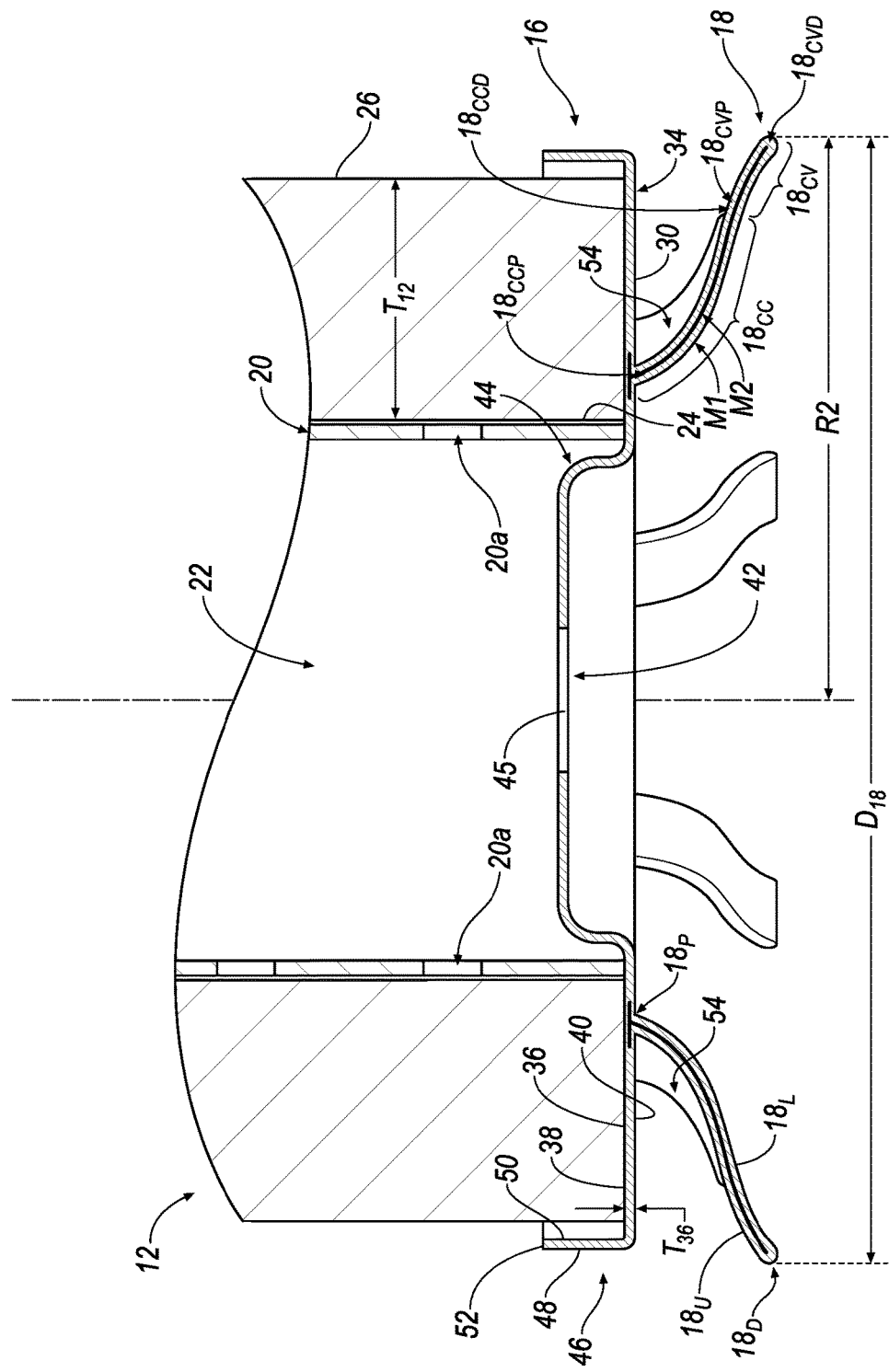
FIG. 5B is an assembled cross-sectional view of the filter media and the exemplary end cap of FIG. 4B.

Referring to FIGS. 4A-5A and 4B-5B, the lower end cap 16 may include any desirable geometry such as, for example, an annular body 36. The annular body 36 is defined by an upper axial surface 38, a lower axial surface 40 and a thickness $T_{36}$ extending between the upper axial surface 38 and the lower axial surface 40. In some implementations, the lower end cap 16 does not include a fluid-flow passage extending through the thickness $T_{36}$ proximate the annular body 36 (i.e., as seen in FIGS. 5A and 5B, the lower axial surface 30 of the tube-shaped body of the filter media 12 is fluidly sealed by the upper axial surface 38 of the lower end cap 16 when the upper axial surface 38 of the lower end cap 16 is disposed adjacent the lower axial surface 30 of the tube-shaped body of the filter media 12 such that the fluid-flow path $F_{F2}$ is not permitted to axially flow through the lower axial surface 30 of the tube-shaped body of the filter media 12 nor through the lower passage 22b formed by the lower axial surface 30 of the filter media 12).

The lower axial surface 40 of the lower end cap 16 may also define an annular-shaped depressed portion 42 for forming an annular-shaped boss 44 extending from the upper axial surface 38 of the lower end cap 16. In some implementations, the annular-shaped depressed portion 42 defines an aperture 45 through the upper and lower axial surfaces 38, 40 of the lower end cap. In some implementations, a button valve assembly (not shown) may be disposed within the aperture 45 to control a flow of fluid therethrough. As seen in FIGS. 5A and 5B, the annular-shaped boss 44 may be at least partially registered within the passage 22 formed by the lower end 34 of the filter media 12 by way of the lower passage 22b formed by the lower axial surface 30 of the filter media 12 when the upper axial surface 38 of the lower end cap 16 is disposed adjacent the lower axial surface 30 of the tube-shaped body of the filter media 12.

A circumferential skirt portion 46 may extend axially away from the upper axial surface 38 of the lower end cap 16. The circumferential skirt portion 46 may be defined by an outer radial surface 48, an inner radial surface 50 and an axial surface 52 connecting the outer radial surface 48 to the inner radial surface 50. The inner radial surface 50 may be arranged opposite or adjacent the outer radial surface 26 of the tube-shaped body of the filter media 12.

The plurality of filter housing-engaging portions 18 integrally extend from the lower axial surface 40 of the annular body 36 of the lower end cap 16. Referring to FIG. 2, while the lower end cap 16 is generally shown to include six filter housing-engaging portions 18a, 18b, 18c, 18d, 18e, 18f, the lower end cap 16 may include any number of filter housing-engaging portions 18 within the scope of the present disclosure. In some implementations, the lower end cap 16 includes three or more filter housing-engaging portions 18. Each filter housing-engaging portion 18 of the plurality of filter housing-engaging portions 18 may be angularly offset from an adjacent one of the filter housing-engaging portions by an angle θ. In some implementations, the filter housing-engaging portions 18 may be equally spaced about the lower end cap 16. Accordingly, if the lower end cap 16 includes three filter housing-engaging portions 18, the angle θ may be approximately equal to 60°. While each filter housing-engaging portion 18a, 18b, 18c, 18d, 18e, 18f is shown as having an axially-extending thickness, a radially-extending length, and a circumferentially-extending width that are equal to an axially-extending thickness, a radially-extending length, and a circumferentially-extending width of the others of the filter housing-engaging portions 18a, 18b, 18c, 18d, 18e, 18f, it will be appreciated that an axially-extending thickness, a radially-extending length, and/or a circumferentially-extending width of at least one of the filter housing-engaging portions 18a, 18b, 18c, 18d, 18e, 18f may be different than an axially-extending thickness, a radially-extending length, and a circumferentially-extending width of one or more of the other filter housing-engaging portions 18a, 18b, 18c, 18d, 18e, 18f. In this way, one or more of the filter housing-engaging portions 18a, 18b, 18c, 18d, 18e, 18f may exhibit a first spring force constant, and one or more of the other filter housing-engaging portions 18a, 18b, 18c, 18d, 18e, 18f may exhibit a second spring force constant that is greater than the first spring force constant.

Referring to FIGS. 4A-5A and 4B-5B, each filter housing-engaging portion 18a-18f of the plurality of filter housing-engaging portions 18 is defined by a proximal end $18_P$ and a distal end $18_D$. Furthermore, each filter housing-engaging portion 18a-18f of the plurality of filter housing-engaging portions 18 is defined by an upper axial surface $18_U$ and a lower axial surface $18_L$. Yet even further, each filter housing-engaging portion 18a-18f of the plurality of filter housing-engaging portions 18 is defined by a first side surface $18_{S1}$ (see, e.g., FIG. 6) and a second side surface $18_{S2}$ (see, e.g., FIG. 6).

The proximal end $18_P$ of each filter housing-engaging portion 18a-18f of the plurality of filter housing-engaging portions 18 integrally extends from the lower axial surface 40 of the annular body 36 of the lower end cap 16. The distal end $18_D$ of each filter housing-engaging portion 18a-18f of the plurality of filter housing-engaging portions 18 connects the upper axial surface $18_U$ to the lower axial surface $18_L$. The first side surface $18_{S1}$ connects the upper axial surface $18_U$ to the lower axial surface $18_L$. The second side surface $18_{S2}$ connects the upper axial surface $18_U$ to the lower axial surface $18_L$.

In some instances, each filter housing-engaging portion 18a-18f of the plurality of filter housing-engaging portions 18 is defined by a generally sinusoidal shape having a concave portion $18_{CC}$ and a convex portion $18_{CV}$. The concave portion $18_{CC}$ of each filter housing-engaging portion 18a-18f includes a proximal end $18_{CCP}$ and a distal end $18_{CCD}$. The convex portion $18_{CV}$ of each filter housing-engaging portion 18a-18f includes a proximal end $18_{CVP}$ and a distal end $18_{CVD}$. In particular, the lower axial surface $18_L$ may be convex proximate the concave portion $18_{CC}$, and the upper axial surface $18_U$ may be concave proximate the concave portion $18_{CC}$. Conversely, the lower axial surface $18_L$ may be concave proximate the convex portion $18_{CV}$ and the upper axial surface $18_U$ may be convex proximate the convex portion $18_{CV}$.

The proximal end $18_{CCP}$ of the concave portion $18_{CC}$ of each filter housing-engaging portion 18a-18f is integral with and extends directly away from the lower axial surface 40 of the annular body 36 of the lower end cap 16. The proximal end $18_{CVP}$ of the convex portion $18_{CV}$ of each filter housing-engaging portion 18a-18f is integral with and extends directly away from the distal end $18_{CCD}$ of the concave portion $18_{CC}$ of each filter housing-engaging portion 18a-18f. The distal end $18_{CVD}$ of the convex portion $18_{CV}$ of each filter housing-engaging portion 18a-18f is a terminal end of each filter housing-engaging portion 18a-18f.

In some examples, the proximal end $18_{CCP}$ of the concave portion $18_{CC}$ of each filter housing-engaging portion 18a-18f is the proximal end $18_P$ of each filter housing-engaging portion 18a-18f of the plurality of filter housing-engaging portions 18. In some instances, the distal end $18_{CVD}$ of the convex portion $18_{CV}$ of each filter housing-engaging portion 18a-18f is the distal end $18_D$ of each filter housing-engaging portion 18a-18f of the plurality of filter housing-engaging portions 18.

As seen in FIGS. 2-3, at least a portion of the upper axial surface $18_U$ each filter housing-engaging portion 18a-18f of the plurality of filter housing-engaging portions 18 includes a deflection limiting portion 54. The deflection limiting portion 54 may include any desirable geometry that limits an amount of spring force exerted by the plurality of filter housing-engaging portions 18 that integrally extend from the lower axial surface 40 of the lower end cap 16 when the filter assembly 10 is secured within a housing 75 a nutplate 77 such that the plurality of filter housing-engaging portions 18 that integrally extend from the lower axial surface 40 of the lower end cap 16 may axially bias the filter assembly 10 away from an inner surface of the housing 75 at an axial distance $D_A$.

Figure 6:
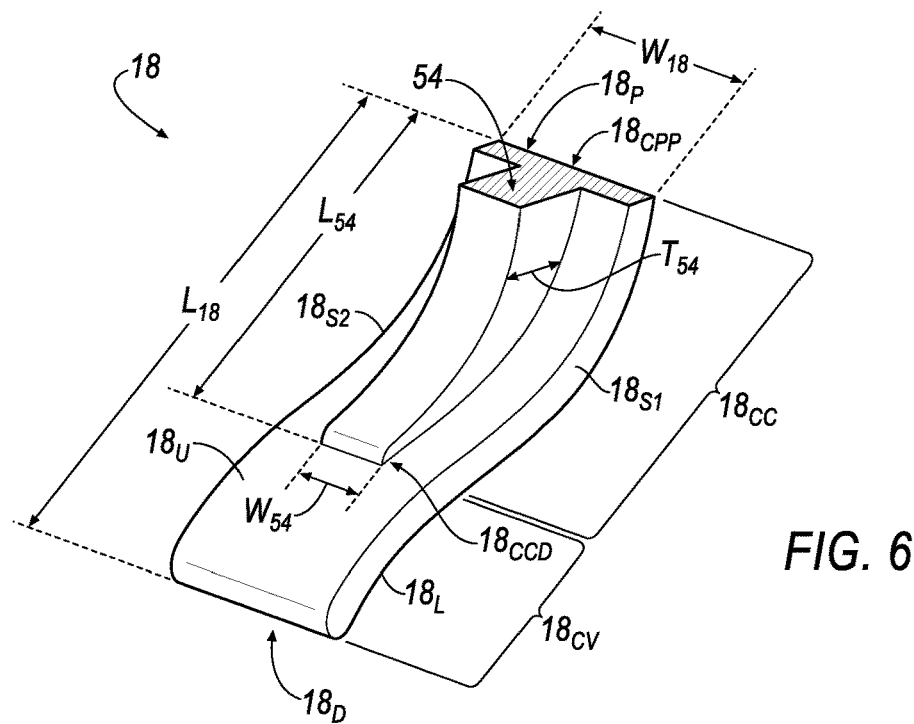
FIG. 6 is a perspective view of a portion of the exemplary end cap of FIGS. 2-3.
Figure 7:
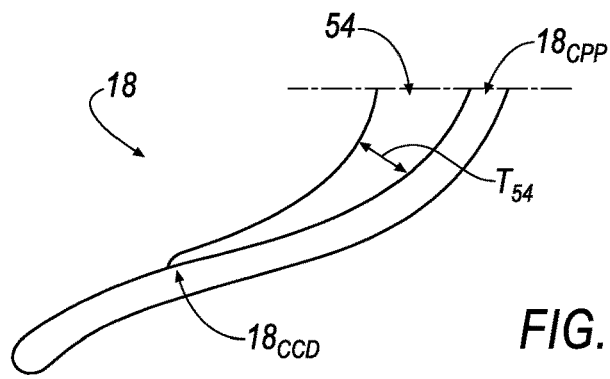
FIG. 7 is a side view of the portion of the exemplary end cap of FIG. 6.
Figure 8:
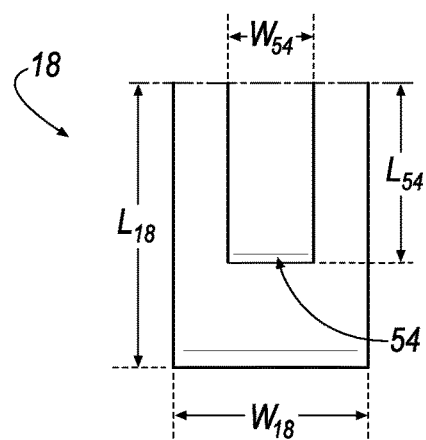
FIG. 8 is a top view of the portion of the exemplary end cap of FIG. 6.

Referring to FIGS. 6-8, in some implementations, each deflection limiting portion 54 may be defined by a length $L_{54}$ that extends along at least a portion of a length $L_{18}$ of each filter housing-engaging portion 18a-18f of the plurality of filter housing-engaging portions 18. In some examples, the length $L_{54}$ of each deflection limiting portion 54 extends along at least a portion of a length of the concave portion $18_{CC}$ of each filter housing-engaging portion 18a-18f of the plurality of filter housing-engaging portions 18.

Referring to FIGS. 6-8, the deflection limiting portion 54 may be further defined by a width $W_{54}$ (see, e.g., FIGS. 6 and 8) and a thickness $T_{54}$ (see, e.g., FIGS. 6-7). The width $W_{54}$ of each deflection limiting portion 54 may be approximately equal to about half of a width $W_{18}$ of each filter housing-engaging portion 18a-18f of the plurality of filter housing-engaging portions 18. The thickness $T_{54}$ of each deflection limiting portion 54 may be defined by a constant thickness or a non-constant thickness that tapers along the length $L_{54}$ of each deflection limiting portion 54 as each deflection limiting portion 54 extends along at least the portion of the length of the concave portion $18_{CC}$ of each filter housing-engaging portion 18a-18f of the plurality of filter housing-engaging portions 18. In some examples, the thickness $T_{54}$ of each deflection limiting portion 54 may be defined by a non-constant thickness including a maximum thickness near the proximal end $18_{CCP}$ of the concave portion $18_{CC}$ of each filter housing-engaging portion 18a-18f of the plurality of filter housing-engaging portions 18 and a minimum thickness near the distal end $18_{CCD}$ of the concave portion $18_{CC}$ of each filter housing-engaging portion 18a-18f of the plurality of filter housing-engaging portions 18.

In some examples, as seen in FIG. 2, the plurality of filter housing-engaging portions 18 are circumferentially arranged about the lower axial surface 40 of the annular body 36 of the lower end cap 16. In some implementations, the proximal end $18_P$ of each filter housing-engaging portion 18a-18f of the plurality of filter housing-engaging portions 18 are each equally radially spaced away from an axial center of the lower end cap 16 at a first radial distance R1. The first radial distance R1 may be equal to approximately half the distance between the axial center of the lower end cap 16 and the outer radial surface 48 of the circumferential skirt portion 46. Furthermore, the distal end $18_D$ of each filter housing-engaging portion 18a-18f of the plurality of filter housing-engaging portions 18 are each equally radially spaced away from the axial center of the lower end cap 16 at a second radial distance R2. The second radial distance R2 may extend radially beyond the outer radial surface 48 of the circumferential skirt portion 46. Yet even further, the proximal end $18_P$ of each filter housing-engaging portion 18a-18f of the plurality of filter housing-engaging portions 18 may be each equally radially spaced away at a radial distance R3 from a circumferential perimeter 56 defining the annular-shaped depressed portion 42 formed by the lower axial surface 40 of the lower end cap 16.

Referring to FIGS. 4A-5A and 4B-5B, in some implementations, distal ends $18_D$ of opposing filter housing-engaging portion 18a-18f of the plurality of filter housing-engaging portions 18 may be spaced apart by a distance defined by a diameter $D_{18}$. The diameter $D_{18}$ defining the distance between distal ends $18_D$ of opposing filter housing-engaging portion 18a-18f of the plurality of filter housing-engaging portions 18 may be approximately equal to twice the second radial distance R2.

As seen in FIG. 1A, the diameter $D_{18}$ defining the distance between distal ends $18_D$ of opposing filter housing-engaging portion 18a-18f of the plurality of filter housing-engaging portions 18 permits the lower end cap to also function as an axial-centering device for axially centering the filter assembly 10 within a cavity 85 defined by the inner surface 76 of housing 75. For example, the inner surface 76 of the housing 75 may be defined by a side surface portion $76_A$, an end surface portion $76_B$ and an intermediate surface portion $76_C$ connecting the side surface portion $76_A$ to the end surface portion $76_B$. The side surface portion $76_A$ may define the cavity 85 of the housing 75 to have a substantially constant diameter $D_{75A}$ extending along most of the length of the housing 75, and the intermediate surface portion $76_C$ slightly tapers at a diameter $D_{75C}$ that is slightly less than the substantially constant diameter $D_{75A}$. In some implementations, the diameter $D_{75C}$ decreases in the axially-extending direction (e.g., in the direction extending towards the end surface portion $76_B$ along the axis A). In this regard, the inner surface 76 may include a radially inwardly-extending portion 86 (e.g., an annular shoulder, ledge, etc.) between (e.g., relative to the axis A) the side surface portion $76_A$ and the intermediate surface portion $76_C$.

The diameter $D_{18}$ defining the distance between distal ends $18_D$ of opposing filter housing-engaging portion 18a-18f of the plurality of filter housing-engaging portions 18 may be approximately equal to but slightly less than the substantially constant diameter $D_{75A}$ extending along most of the length of the housing 75 such that as the filter assembly 10 is axially inserted into the cavity 85, if any of the distal ends $18_D$ of the filter housing-engaging portion 18a-18f of the plurality of filter housing-engaging portions 18 contacts the surface portion $76_A$, the filter assembly 10 remains relatively axially aligned with the central axis A-A extending through the housing 75. Furthermore, once the filter assembly 10 is disposed within the housing 75, (i) one or both of the lower axial surface $18_L$ and the distal end $18_D$ of each filter housing-engaging portion 18a-18f of the plurality of filter housing-engaging portions 18 may engage the inner surface 76 of the housing 75, and (ii) the proximal end $18_P$ of each filter housing-engaging portion 18a-18f of the plurality of filter housing-engaging portions 18 may be disposed between the center tube 120 of the filter media 112 and the outer radial surface 26 of the filter media in a radially-extending direction. In some implementations, one or both of the lower axial surface $18_L$ and the distal end $18_D$ of each filter housing-engaging portion 18a-18f of the plurality of filter housing-engaging portions 18 may engage the intermediate surface portion $76_C$ of the housing 75. In some implementations, one or both of the lower axial surface $18_L$ and the distal end $18_D$ of each filter housing-engaging portion 18a-18f of the plurality of filter housing-engaging portions 18 may engage the inner surface 76 at the radially inwardly-extending portion 86 (e.g., an annular shoulder, ledge, etc.) of the housing 75.

Figure 1B:
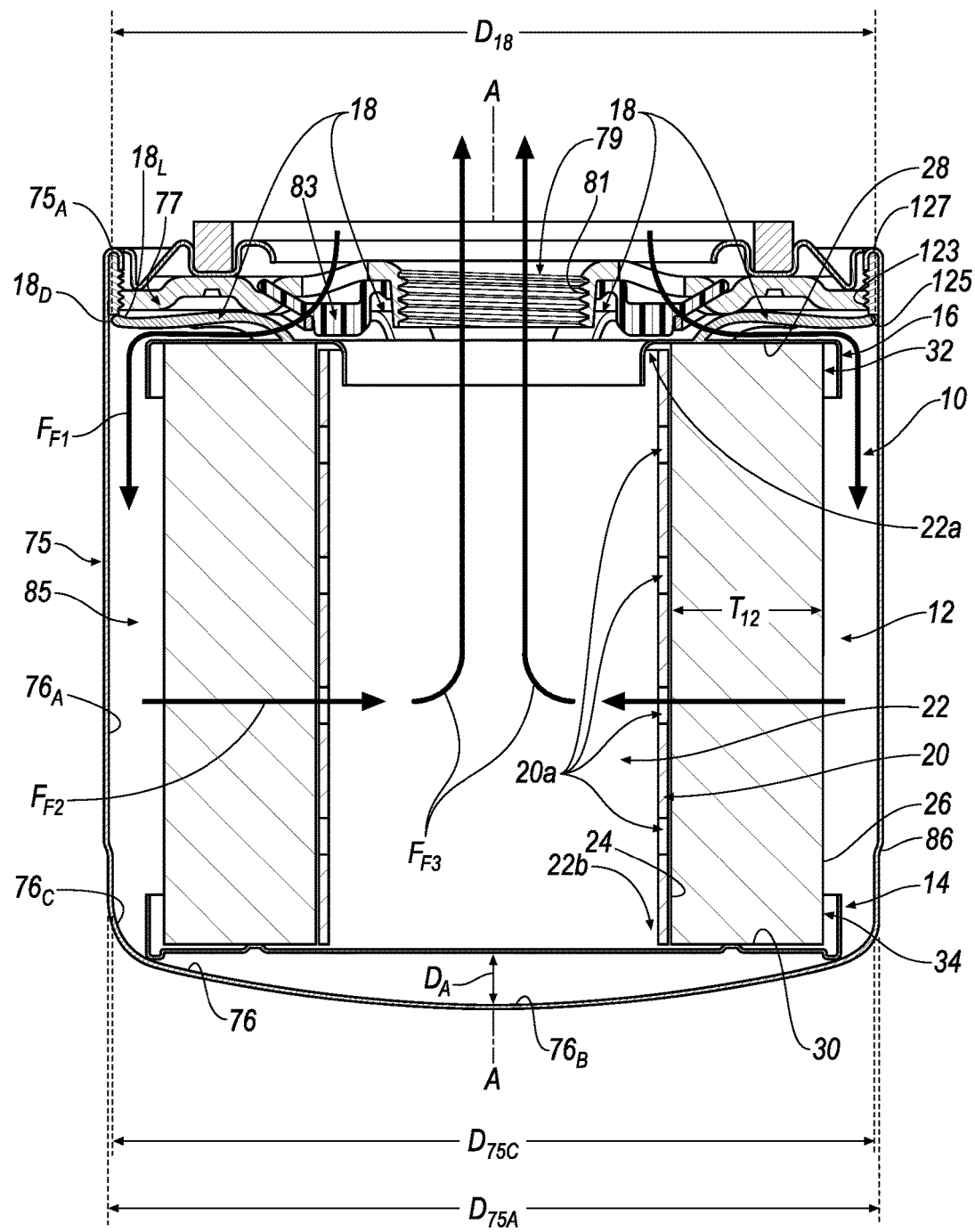
FIG. 1B is a cross-sectional view of another exemplary filter assembly disposed within a housing.

Referring to FIG. 1B, in some implementations, the filter assembly 10 includes an insert 123. The insert 123 may be disposed within the housing 75 and may extend axially from a stop surface 125 to retention surface 127. In some implementations, the insert 123 extends annularly about the inner surface 76 of the housing 75 such that retention surface 127 engages a portion of the inner surface 76. In this regard, the inner surface 76 may include a radially inwardly-extending portion $75_A$ engaging the retention surface 127 of the insert 123. For example, the radially inwardly-extending portion $75_A$ may define a hook shape (e.g, a J-shape) engaging the retention surface 127 of the insert 123.

The stop surface 125 may extending in a direction transverse to, and about, the axis A. In some implementations, the stop surface 125 extends substantially perpendicular to, and about, the axis A. In the assembled configuration, the lower end cap 16 may engage the insert 123 or the nut plate 77, and the upper end cap 14 may engage the inner surface 76 of the housing 75. In particular, once the filter assembly 10 is disposed within the housing 75, (i) one or both of the lower axial surface $18_L$ and the distal end $18_D$ of each filter housing-engaging portion 18a-18f of the plurality of filter housing-engaging portions 18 may engage the insert 123, and (ii) the proximal end $18_P$ of each filter housing-engaging portion 18a-18f of the plurality of filter housing-engaging portions 18 may be disposed between the center tube 120 of the filter media 112 and the outer radial surface 26 of the filter media in a radially-extending direction. In some implementations, one or both of the lower axial surface $18_L$ and the distal end $18_D$ of each filter housing-engaging portion 18a-18f of the plurality of filter housing-engaging portions 18 may engage the stop surface 125 of the insert 123.

Figure 1C:
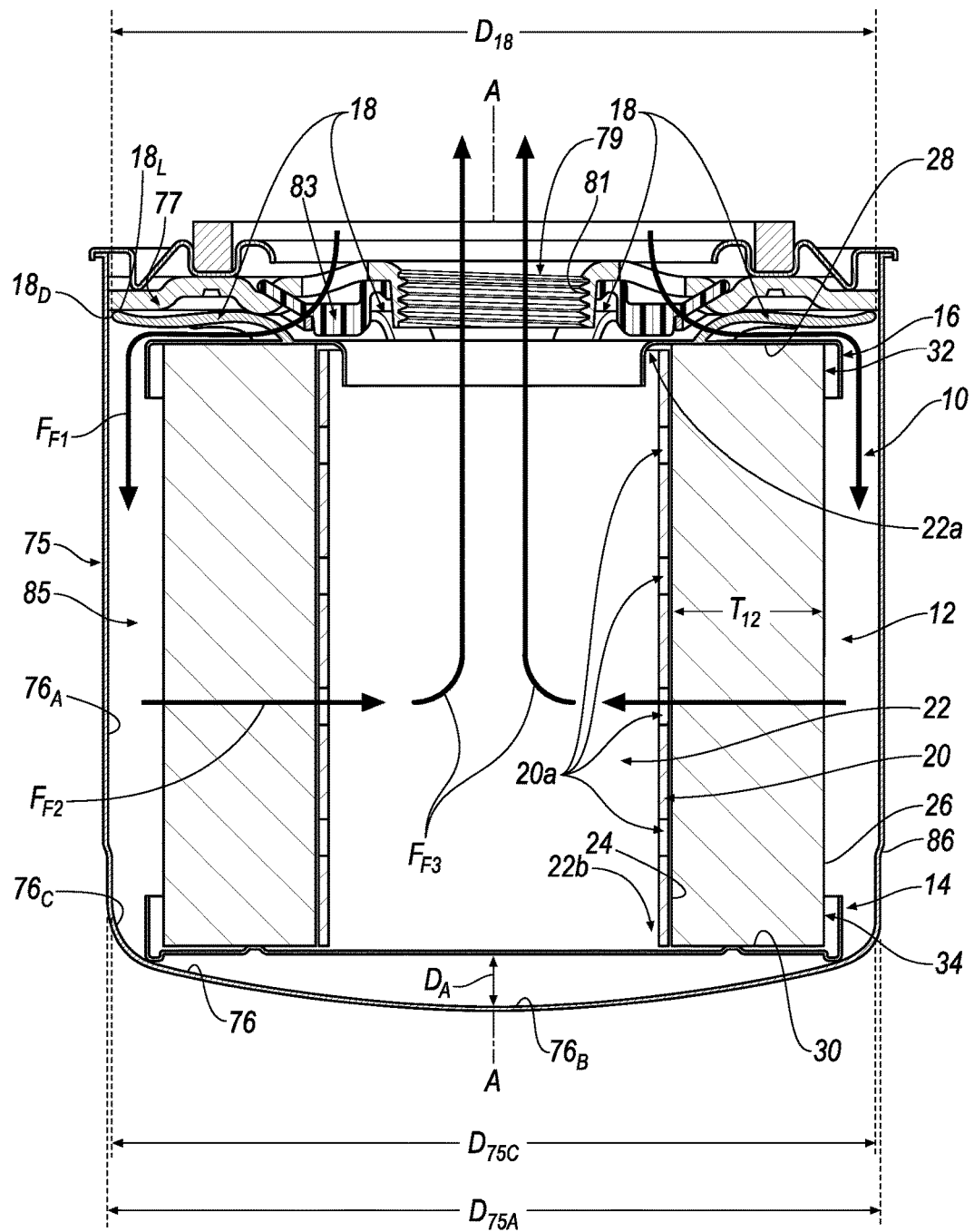
FIG. 1C is a cross-sectional view of another exemplary filter assembly disposed within a housing.

Referring to FIG. 1C, in some implementations, the lower end cap 16 may engage the nut plate 77, and the upper end cap 14 may engage the inner surface 76 of the housing 75. In particular, once the filter assembly 10 is disposed within the housing 75, (i) one or both of the lower axial surface $18_L$ and the distal end $18_D$ of each filter housing-engaging portion 18a-18f of the plurality of filter housing-engaging portions 18 may engage the nut plate 77, and (ii) the proximal end $18_P$ of each filter housing-engaging portion 18a-18f of the plurality of filter housing-engaging portions 18 may be disposed between the center tube 120 of the filter media 112 and the outer radial surface 26 of the filter media in a radially-extending direction.

Referring to FIGS. 4A-5A and 4B-5B, in some instances, the lower end cap 16 that integrally includes the plurality of filter housing-engaging portions 18 may be made from one material M1, or, alternatively, two or more materials M1, M2 (e.g., a plastic material and a metal material). In an example, as seen in FIGS. 4A-5A, the lower end cap 16 that integrally includes the plurality of filter housing-engaging portions 18 may be molded from one material M1 such as a plastic material or a metal material. In another examples, as seen in FIGS. 4B-5B, the lower end cap 16 that integrally includes the plurality of filter housing-engaging portions 18 may be formed by a first material M1 and a second material M2; the second material M2 may include, for example, a metal material that is a core member of each filter housing-engaging portion 18a-18f of the plurality of filter housing-engaging portions 18 and extends along at least a portion of a length $L_{18}$ of each filter housing-engaging portion 18a-18f of the plurality of filter housing-engaging portions 18 and into a portion of the thickness $T_{36}$ of the annular body 36 of the lower end cap 16, and the first material M1 may include, for example, a plastic material that forms an outer body that is molded-over the second material M2 such that the first material M1 defines at least a portion of both of the lower end cap 16 and the plurality of filter-engaging portions 18. In some implementations, at least one of the filter housing-engaging portions 18a-18f may include a first material (e.g., M1), and at least another of the filter housing-engaging portions 18a-18f may include a second material (e.g., M2) such that the at least one of the filter housing-engaging portions 18a-18f exhibits a first spring force constant, and the at least another of the filter housing-engaging portions 18a-18f exhibits a second spring force constant that is greater than the first spring force constant.

Figure 9:
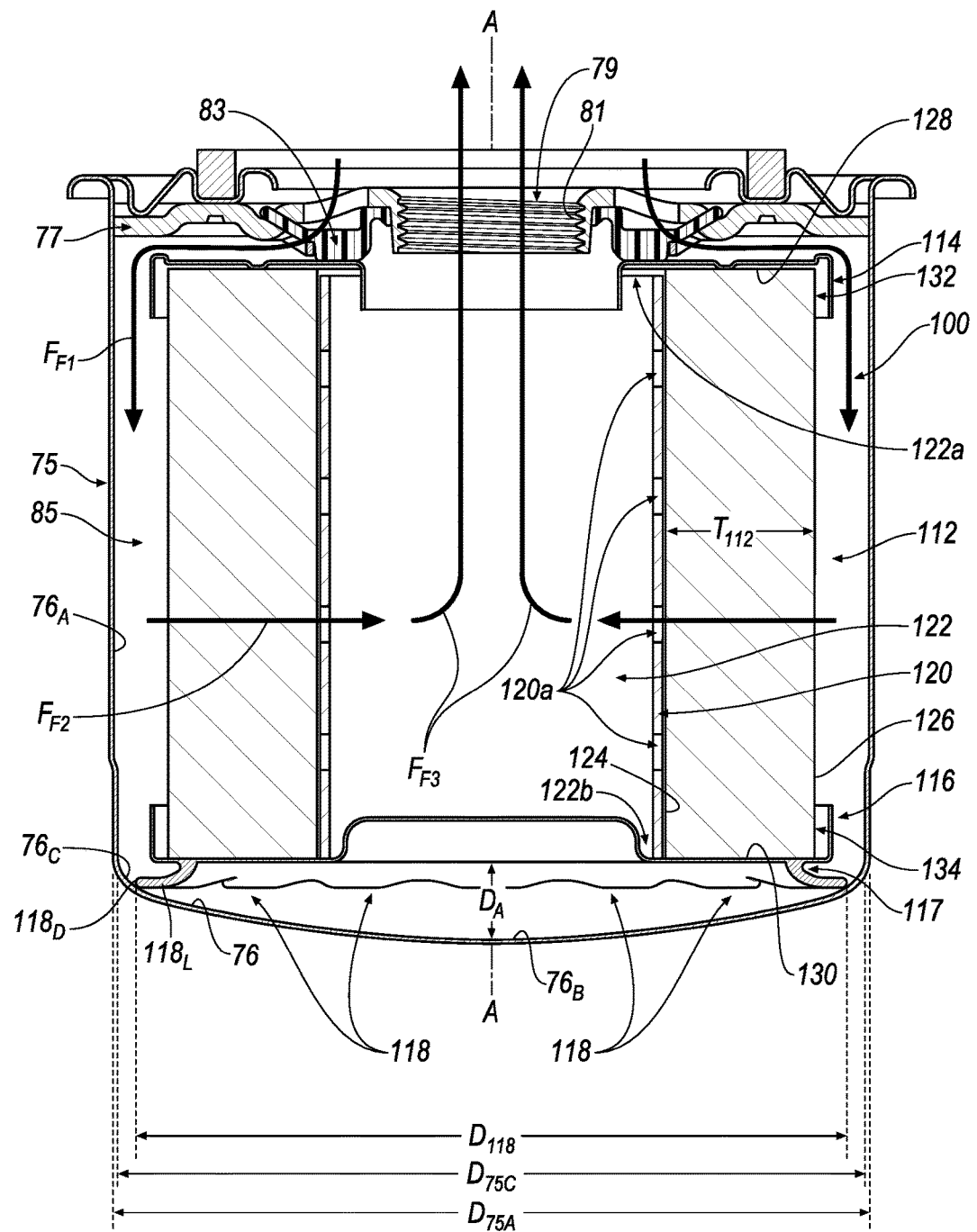
FIG. 9 is a cross-sectional view of an exemplary filter assembly disposed within a housing.
Figure 10:
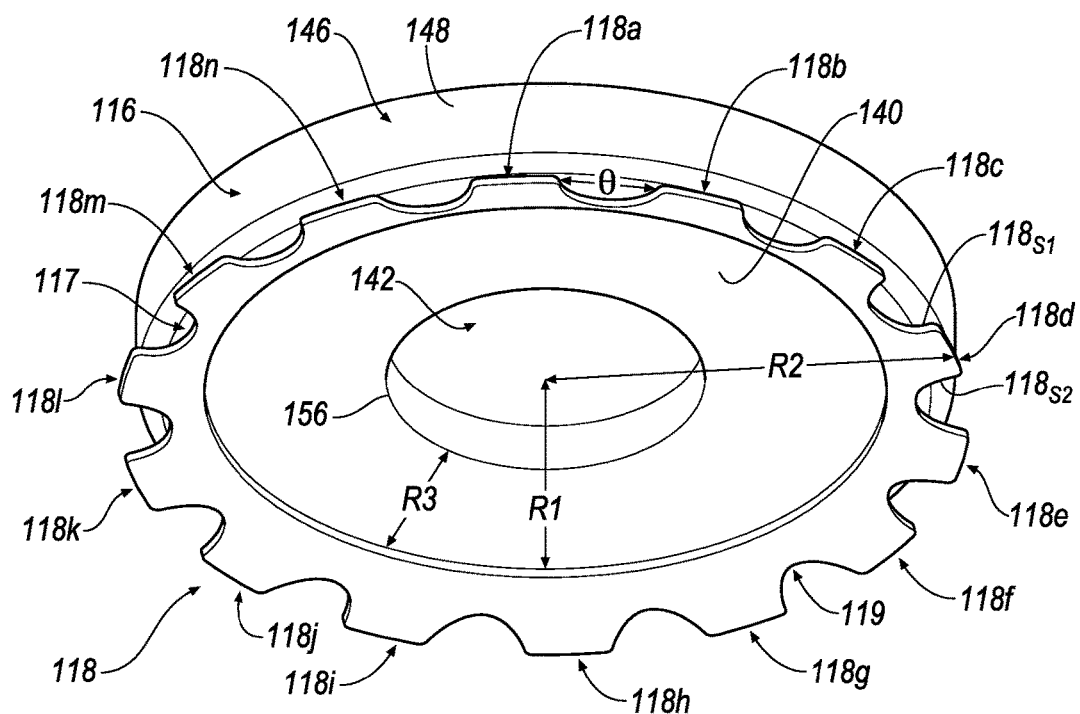
FIG. 10 is a perspective view of an exemplary end cap of the filter assembly of FIG. 9.
Figure 11:
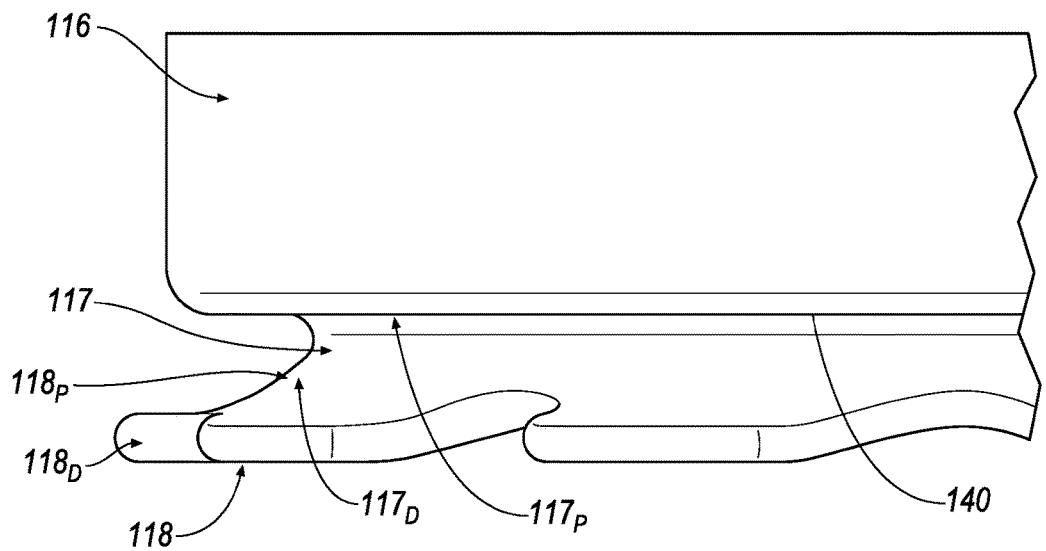
FIG. 11 is a side view of the exemplary end cap of FIG. 10.
Figure 13A:
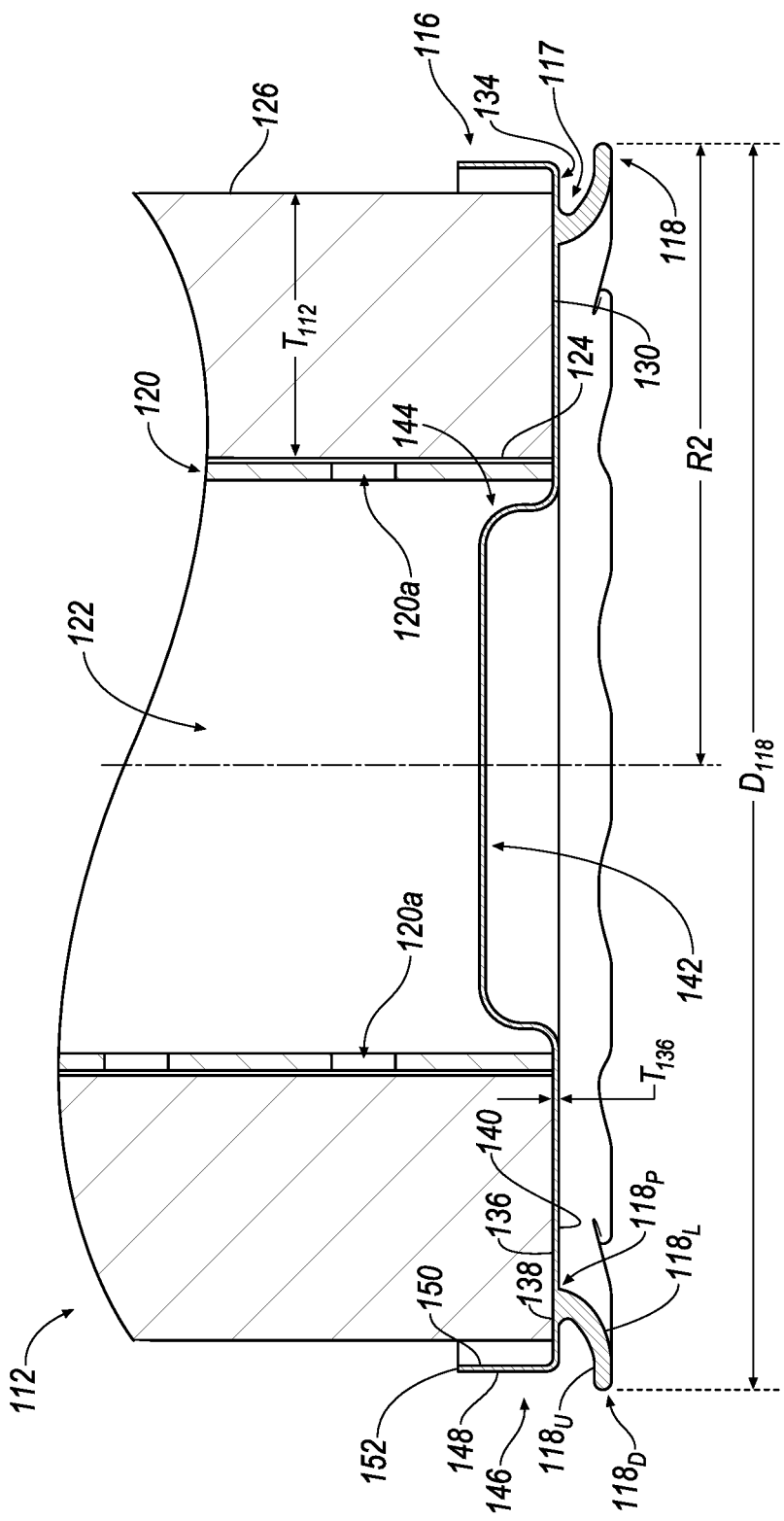
FIG. 13A is an assembled cross-sectional view of the filter media and the exemplary end cap of FIG. 12A.
Figure 13B:
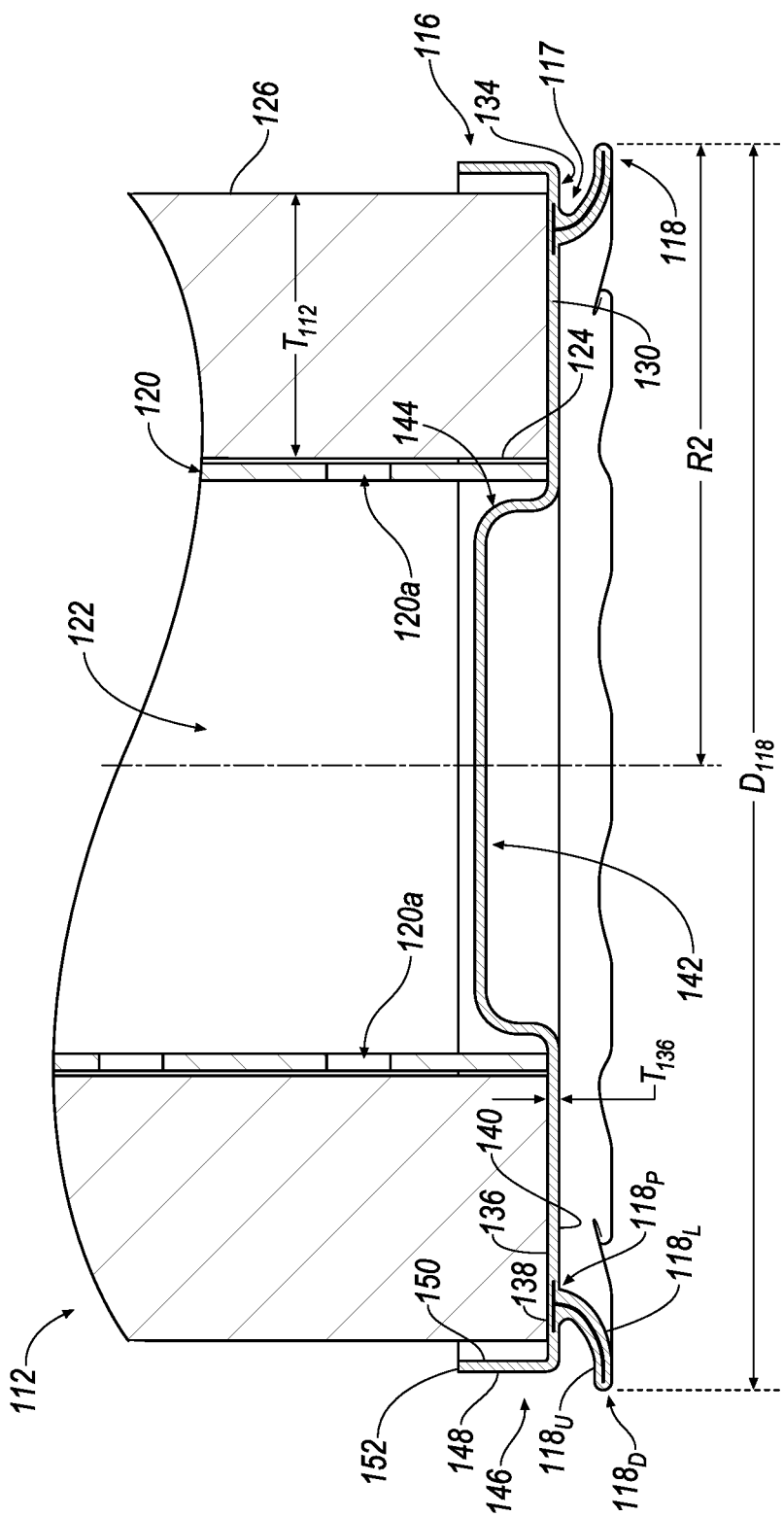
FIG. 13B is an assembled cross-sectional view of the filter media and the exemplary end cap of FIG. 12B.

Referring to FIG. 9, an exemplary filter assembly is shown generally at 100. The filter assembly 100 includes filter media 112, an upper end cap 114 and a lower end cap 116. As seen in FIGS. 9-11, a ring portion 117 including a plurality of filter housing-engaging portions 118 integrally extends from the lower end cap 116. In this regard, one or more of the filter housing-engaging portions 118 may be integrally and/or monolithically formed with the lower end cap 116. Referring to FIGS. 12A-13A and 12B-13B, in some examples, the lower end cap 116 that integrally includes the ring portion 117 including the plurality of filter housing-engaging portions 118 may be made from any desirable material M1, M2 (e.g., a plastic material, a metal material or the like). The material(s) M1, M2 defining the lower end cap 116 including ring portion 117 including the plurality of filter housing-engaging portions 118 may be made from a flexible material that is capable of imparting a spring force. The spring force may be imparted by the ring portion 117 including the plurality of filter housing-engaging portions 118 when ring portion 117 including the plurality of filter housing-engaging portions 118 axially engage and are axially pushed toward a surface (such as, e.g., an inner surface 76 of a housing 75 that contains the filter assembly 100) such that the lower end cap 116 axially biases the filter assembly 100 away from the surface that the ring portion 117 including the plurality of housing-engaging portions 118 engages at an axial distance $D_A$.

As seen in FIG. 9, the filter media 112 may include any desirable geometry such as, for example, a tube-shaped body. The filter assembly 100 may optionally include a center tube 120 disposed within a passage 122 defined by the tube-shaped body of the filter media 112. The passage 122 is defined by an inner radial surface 124 of the tube-shaped body of the filter media 112. The tube-shaped body of the filter media 112 is also defined by an outer radial surface 26, an upper axial surface 128 and a lower axial surface 130. Access to the passage 122 is permitted by an upper opening 122a formed by the upper axial surface 128 or a lower opening 122b formed by the lower axial surface 130.

Both of the upper axial surface 128 and the lower axial surface 130 connect the inner radial surface 124 to the outer radial surface 26. The upper axial surface 128 and a portion of each of the inner radial surface 124 and the outer radial surface 26 extending from the upper axial surface 128 generally defines an upper end 132 of the tube-shaped body. The lower axial surface 130 and a portion of each of the inner radial surface 124 and the outer radial surface 26 extending from the lower axial surface 130 generally defines a lower end 134 of the tube-shaped body of the filter media 112.

The center tube 120 may be disposed within the passage 122 and directly adjacent the inner radial surface 124 of the tube-shaped body of the filter media 112. Functionally, the center tube 120 may rigidify the tube-shaped body of the filter media 112. The center tube 120 may also include a plurality of radial passages 120a. The plurality of radial passages 120a permit radial fluid flow (see, e.g., fluid-flow path $F_{F2}$): (1) from the outer radial surface 26 of the tube-shaped body of the filter media 112; (2) through a radial thickness dimension $T_{112}$ of the tube-shaped body of the filter media 112; (3) out of the inner radial surface 124 of the tube-shaped body of the filter media 112; (4) through the plurality of radial passages 120a of the center tube 120; and (5) into the passage 122 formed by the tube-shaped body of the filter media 112.

Referring to FIG. 9, the filter assembly 100 is shown disposed within a housing 75. The housing 75 includes the nutplate 77 having an axial passage 79 defined by a threaded surface 81. The upper end cap 114 is connected to a portion 83 of the nutplate 77 in a fluidly-sealed relationship. As described above, the ring portion 117 including the plurality of filter housing-engaging portions 118 of the lower end cap 116 imparts a spring force when the ring portion 117 including the plurality of filter housing-engaging portions 118 axially engage and are axially pushed toward the inner surface 76 of the housing 75 such that the lower end cap 116 axially biases the filter assembly 100 away from the surface 76 at an axial distance $D_A$.

When the housing 75 is connected to an engine mount head (not shown) by the threaded surface 81, a fluid is permitted to flow: (1) from the engine mount head and into a void (see fluid-flow path $F_{F1}$) between the inner surface 76 of the housing 75 and the filter assembly 100; (2) through (see fluid-flow path $F_{F2}$) the filter assembly 100; and out of (see fluid-flow path $F_{F3}$) the filter assembly 100 back to the engine mount head. The fluid-flow path shown generally at $F_{F1}$ defines a flow path of an unfiltered fluid flowing within the housing 75 and toward the outer radial surface 26 of the tube-shaped body of the filter media 112. The fluid-flow path shown generally at $F_{F2}$ defines a flow path of the unfiltered fluid flowing through the tube-shaped body of the filter media 112 from the outer radial surface 26 of the tube-shaped body of the filter media 112 to the inner radial surface 124 of the tube-shaped body of filter media 112; by permitting the unfiltered fluid to flow through the tube-shaped body of filter media 112, impurities are removed from the fluid such that the fluid emerging from the inner radial surface 124 of the tube-shaped body of filter media 112 is no longer unfiltered fluid, but, rather, filtered fluid. The fluid-flow path shown generally at $F_{F3}$ defines filtered fluid flowing from the inner radial surface 124 of the tube-shaped body of the filter media 112 and into the passage 122 defined by the inner radial surface 124 of the tube-shaped body of the filter media 112.

Referring to FIGS. 12A-13A and 12B-13B, the lower end cap 116 may include any desirable geometry such as, for example, an annular body 136. The annular body 136 is defined by an upper axial surface 138, a lower axial surface 140 and a thickness $T_{136}$ extending between the upper axial surface 138 and the lower axial surface 140. The lower end cap 116 does not include a fluid-flow passage extending through the thickness $T_{136}$ (i.e., the lower axial surface 130 of the tube-shaped body of the filter media 112 is fluidly sealed by the upper axial surface 138 of the lower end cap 116 when the upper axial surface 138 of the lower end cap 116 is disposed adjacent the lower axial surface 130 of the tube-shaped body of the filter media 112 such that the fluid-flow path $F_{F2}$ is not permitted to axially flow through the lower axial surface 130 of the tube-shaped body of the filter media 112 nor through the lower passage 122b formed by the lower axial surface 130 of the filter media 112).

The lower axial surface 140 of the lower end cap 116 may also define an annular-shaped depressed portion 142 for forming an annular-shaped boss 144 extending from the upper axial surface 138 of the lower end cap 116. The annular-shaped boss 144 may be at least partially registered within the passage 122 formed by the lower end 134 of the filter media 112 by way of the lower passage 122b formed by the lower axial surface 130 of the filter media 112 when the upper axial surface 138 of the lower end cap 116 is disposed adjacent the lower axial surface 130 of the tube-shaped body of the filter media 112.

A circumferential skirt portion 146 may extend axially away from the upper axial surface 138 of the lower end cap 116. The circumferential skirt portion 146 may be defined by an outer radial surface 148, an inner radial surface 150 and an axial surface 152 connecting the outer radial surface 148 to the inner radial surface 150. The inner radial surface 150 may be arranged opposite or adjacent the outer radial surface 26 of the tube-shaped body of the filter media 112.

The ring portion 117 including the plurality of filter housing-engaging portions 118 integrally extend from the lower axial surface 140 of the annular body 136 of the lower end cap 116. In some implementations, as seen in FIG. 10, the plurality of filter housing-engaging portions 118 extending away from the ring portion 117 includes fourteen filter housing-engaging portions 118a, 118b, 118c, 118d, 118e, 118f, 118g, 118h, 118i, 118j, 118k, 118l, 118m, 118n. Each filter housing-engaging portion 118 of the plurality of filter housing-engaging portions 118 may be angularly offset from an adjacent one of the filter housing-engaging portions 118 by an angle θ. In some implementations, the filter housing-engaging portions 118 may be equally spaced about the lower end cap 116. Accordingly, if the lower end cap 16 includes fourteen filter housing-engaging portions 118a-n, the angle θ may be approximately equal to 25°.

As seen in FIGS. 12A-13A and 12B-13B, each filter housing-engaging portion 118a-118n of the plurality of filter housing-engaging portions 118 is defined by a proximal end $118_P$ and a distal end $118_D$. Furthermore, each filter housing-engaging portion 118a-118n of the plurality of filter housing-engaging portions 118 is defined by an upper axial surface $118_U$ and a lower axial surface $118_L$. Yet even further, each filter housing-engaging portion 118a-118n of the plurality of filter housing-engaging portions 118 is defined by a first side surface $118_{S1}$ (see, e.g., FIG. 10) and a second side surface $118_{S2}$ (see, e.g., FIG. 10).

Referring to FIG. 11, the proximal end $118_P$ of each filter housing-engaging portion 118a-118n of the plurality of filter housing-engaging portions 118 integrally extends from a distal end $117_D$ of the ring portion 117. A proximal end $117_P$ of the ring portion 117 extends from the lower axial surface 140 of the annular body 136 of the lower end cap 116. As seen in FIGS. 12A-13A and 12B-13B, the distal end $118_D$ of each filter housing-engaging portion 118a-118n of the plurality of filter housing-engaging portions 118 connects the upper axial surface $118_U$ to the lower axial surface $118_L$. The first side surface $118_{S1}$ connects the upper axial surface $118_U$ to the lower axial surface $118_L$. The second side surface $118_{S2}$ connects the upper axial surface $118_U$ to the lower axial surface $118_L$. In some instances, as seen in FIG. 10, the first side surface $118_{S1}$ and the second side surface $118_{S2}$ of each filter housing-engaging portion 118a-118n of the plurality of filter housing-engaging portions 118 is defined by a generally arcuate shape such that a first side surface $118_{S1}$ of a filter housing-engaging portion 118a-118n connected to a second side surface $118_{S2}$ of an adjacent filter housing-engaging portion 118a-118n collectively defines a concave surface 119.

In some examples, the plurality of filter housing-engaging portions 118 are circumferentially arranged about the distal end $117_D$ of the ring portion 117. In some implementations, as seen in FIG. 10, the ring portion 117 is radially spaced away from an axial center of the lower end cap 116 at a first radial distance R1. The first radial distance R1 may be equal to approximately seventh-eighths the distance between the axial center of the lower end cap 116 and the outer radial surface 148 of the circumferential skirt portion 146. Furthermore, the distal end $118_D$ of each filter housing-engaging portion 118a-118n of the plurality of filter housing-engaging portions 118 may be each equally radially spaced away from the axial center of the lower end cap 116 at a second radial distance R2. The second radial distance R2 may extend radially beyond the outer radial surface 148 of the circumferential skirt portion 146. Yet even further, the ring portion 117 may be radially spaced away at a radial distance R3 from a circumferential perimeter 156 defining the annular-shaped depressed portion 142 formed by the lower axial surface 140 of the lower end cap 116.

As seen in FIGS. 12A-13A and 12B-13B, in some implementations, distal ends $118_D$ of opposing filter housing-engaging portion 118a-118n of the plurality of filter housing-engaging portions 118 may be spaced apart by a distance defined by a diameter $D_{118}$. The diameter $D_{118}$ defining the distance between distal ends $118_D$ of opposing filter housing-engaging portion 118a-118n of the plurality of filter housing-engaging portions 118 is approximately equal to twice the second radial distance R2.

Referring to FIG. 9, the diameter $D_{118}$ defining the distance between distal ends $118_D$ of opposing filter housing-engaging portion 118a-118n of the plurality of filter housing-engaging portions 118 permits the lower end cap to also function as an axial-centering device for axially centering the filter assembly 100 within a cavity 85 defined by the inner surface 76 of housing 75. For example, the inner surface 76 of the housing 75 may be defined by a side surface portion $76_A$, an end surface portion $76_B$ and an intermediate surface portion $76_C$ connecting the side surface portion $76_A$ to the end surface portion $76_B$. The side surface portion $76_A$ may define the cavity 85 of the housing 75 to have the diameter $D_{75A}$ extending along most of the length of the housing 75, and the intermediate surface portion $76_C$ slightly tapers at the diameter $D_{75C}$ that is slightly less than the substantially constant diameter $D_{75A}$. In some implementations, the diameter $D_{75C}$ decreases in the axially-extending direction (e.g., in the direction extending towards the end surface portion $76_B$ along the axis A). In this regard, the inner surface 76 may include a radially inwardly-extending portion 86 (e.g., an annular shoulder, ledge, etc.) between (e.g., relative to the axis A) the side surface portion $76_A$ and the intermediate surface portion $76_C$.

The diameter $D_{118}$ defining the distance between distal ends $118_D$ of opposing filter housing-engaging portion 118a-118n of the plurality of filter housing-engaging portions 118 may be approximately equal to but slightly less than the constant diameter $D_{75A}$ extending along most of the length of the housing 75 such that as the filter assembly 100 is axially inserted into the cavity 85, if any of the distal ends $18_D$ of the filter housing-engaging portion 118a-118n of the plurality of filter housing-engaging portions 118 contacts the surface portion $76_A$, the filter assembly 100 remains relatively axially aligned with the central axis A-A extending through the housing 75. Furthermore, once the filter assembly 100 is disposed within the housing 75, (i) one or both of the lower axial surface $118_L$ and the distal end $118_D$ of each filter housing-engaging portion 118a-118n of the plurality of filter housing-engaging portions 118 may engage the intermediate surface portion $76_C$, and (ii) the proximal end $118_P$ of each filter housing-engaging portion 118a-118n of the plurality of filter housing-engaging portions 118 may be disposed between the center tube 120 of the filter media 112 and the outer radial surface 26 of the filter media in a radially-extending direction.

Referring to FIGS. 12A-13A and 12B-13B, in some instances, the lower end cap 116 that integrally includes the ring portion 117 including the plurality of filter housing-engaging portions 118 may be made from one material M1, or, alternatively, two or more materials M1, M2 (e.g., a plastic material and a metal material). In an example, as seen in FIGS. 12A-13A, the lower end cap 116 that integrally includes the ring portion 117 including the plurality of filter housing-engaging portions 118 may be molded from one material M1 such as a plastic material or a metal material. In another examples, as seen in FIGS. 12B-13B, the lower end cap 116 that integrally includes the ring portion 117 including the plurality of filter housing-engaging portions 118 may be formed by a first material M1 and a second material M2; the second material M2 may include, for example, a metal material that is a core member of each filter housing-engaging portion 118a-118n of the plurality of filter housing-engaging portions 118 and extends: (1) along at least a portion of a length of each filter housing-engaging portion 118a-118n of the plurality of filter housing-engaging portions 118, (2) through the ring portion 117, and (3) into a portion of the thickness $T_{136}$ of the annular body 136 of the lower end cap 116, and the first material M1 may include, for example, a plastic material that forms an outer body that is molded-over the second material M2 such that the first material M1 defines at least a portion of both of the lower end cap 116, the ring portion 117 and the plurality of filter-engaging portions 118.

Figure 14:
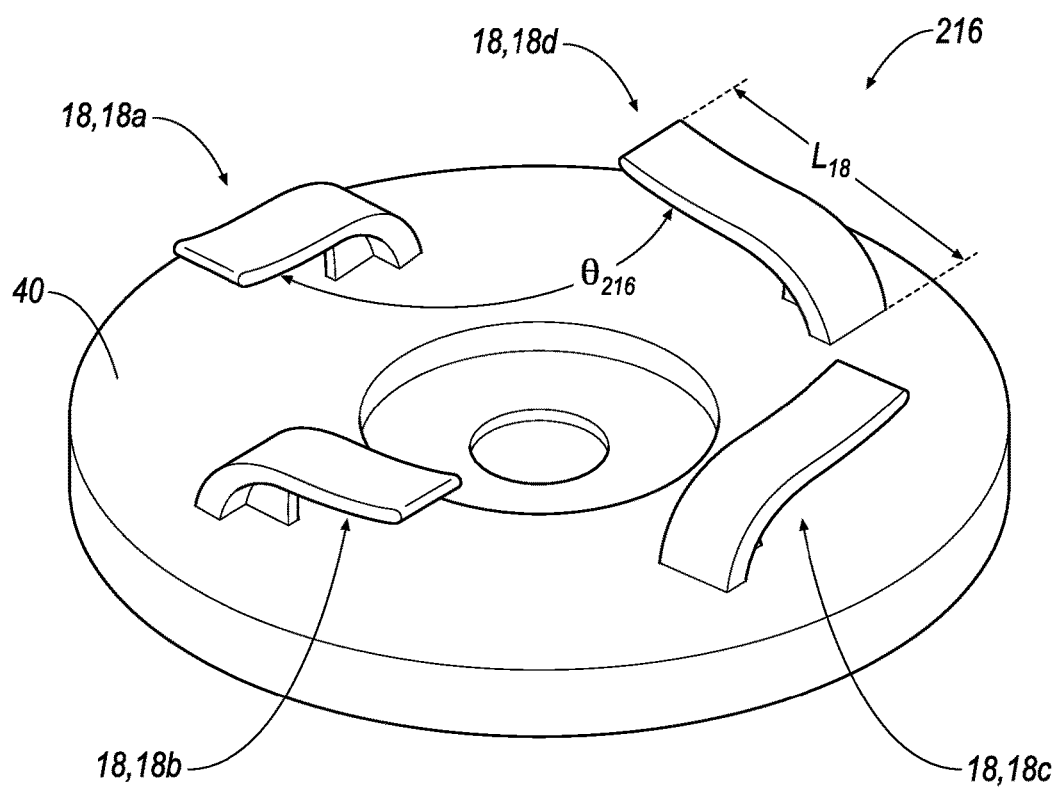
FIG. 14 is a perspective view of an exemplary end cap.

Referring to FIG. 14, an exemplary lower end cap 216 for use with a filter assembly (e.g., filter assembly 10, filter assembly 100) is shown. The structure and function of the lower end cap 216 may be substantially similar to that of the lower end cap 16 and/or the lower end cap 116, apart from any exceptions described below and/or shown in the Figures. Accordingly, the structure and/or function of similar features will not be described again in detail. In addition, like reference numerals are used hereinafter and in the drawings to identify like features.

The lower end cap 216 may include a plurality of the filter housing-engaging portions 18. While the lower end cap 216 is generally shown to include four filter housing-engaging portions 18a, 18b, 18c, 18d, the lower end cap 216 may include any number of filter housing-engaging portions 18 within the scope of the present disclosure. In some implementations, the lower end cap 216 includes three or more filter housing-engaging portions 18.

Figure 15A:
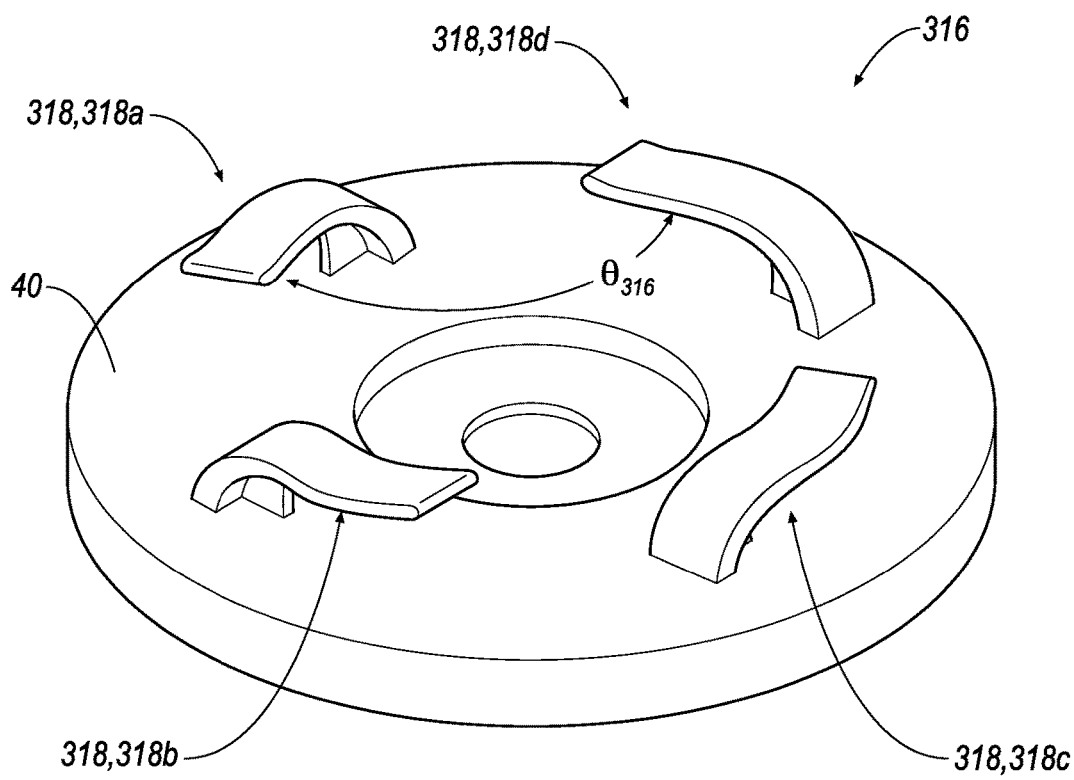
FIG. 15A is a perspective view of an exemplary end cap.

Each filter housing-engaging portion 18 of the plurality of filter housing-engaging portions 18 may be angularly offset from an adjacent one of the filter housing-engaging portions by an angle $\theta_{216}$. In some implementations, the filter housing-engaging portions 18 may be equally spaced about the lower end cap 16. In this regard, the filter housing-engaging portions 18 may be disposed on, and/or extend from, the lower axial surface 40 such that, in the assembled configuration (e.g., FIGS. 1A, 1B, 1C, 9) the length $L_{18}$ of each filter housing-engaging portion 18 extends in a direction transverse to the axis A. For example, if the lower end cap 16 includes four filter housing-engaging portions 18, the angle $\theta_{216}$ may be approximately equal to 90°, and the lengths $L_{18}$ of the filter housing-engaging portions 18a, 18b, 18c, 18d may collectively define a rectangular (e.g., square) shape. The angular offset of the filter housing-engaging portions 18 can allow a user to more easily assemble a filter assembly (e.g., filter assembly 10, filter assembly 100), while also improving the functionality of the filter assembly Referring to FIGS. 15A and 15B, another exemplary lower end cap 316 for use with a filter assembly (e.g., filter assembly 10, filter assembly 100) is shown. The structure and function of the lower end cap 316 may be substantially similar to that of the lower end caps 16, 116 and/or 216, apart from any exceptions described below and/or shown in the Figures. Accordingly, the structure and/or function of similar features will not be described again in detail. In addition, like reference numerals are used hereinafter and in the drawings to identify like features.

The lower end cap 316 may include a plurality of filter housing-engaging portions 318. While the lower end cap 316 is generally shown to include four filter housing-engaging portions 318a, 318b, 318c, 318d, the lower end cap 316 may include any number of filter housing-engaging portions 318 within the scope of the present disclosure. In some implementations, the lower end cap 316 includes three or more filter housing-engaging portions 318.

Each filter housing-engaging portion 318 of the plurality of filter housing-engaging portions 318 may be angularly offset from an adjacent one of the filter housing-engaging portions by an angle $\theta_{316}$. In some implementations, the filter housing-engaging portions 318 may be equally spaced about the lower end cap 316. In this regard, the filter housing-engaging portions 318 may be disposed on, and/or extend from, the lower axial surface 40 such that, in the assembled configuration (e.g., FIGS. 1A, 1B, 1C, 9) the length $L_{318}$ of each filter housing-engaging portion 318 extends in a direction transverse to the axis A. For example, if the lower end cap 316 includes four filter housing-engaging portions 318, the angle $\theta_{316}$ may be approximately equal to 90°, and the lengths $L_{318}$ of the filter housing-engaging portions 318a, 318b, 318c, 318d may collectively define a rectangular (e.g., square) shape.

Figure 15B:
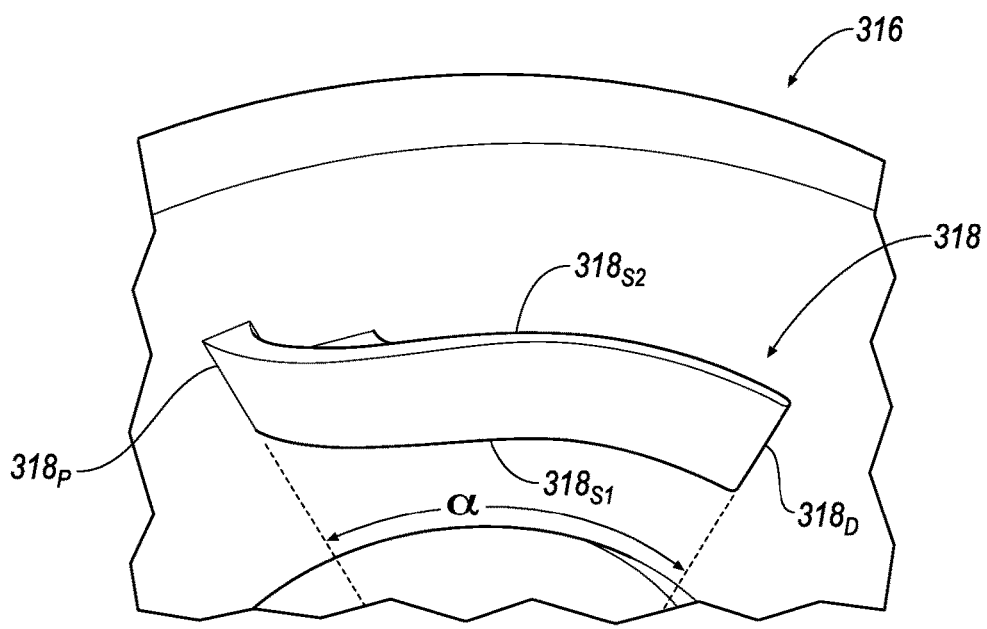
FIG. 15B is a top perspective view of the end cap of FIG. 15A.

With particular reference to FIG. 15B, each filter housing-engaging portion 318a-318d of the plurality of filter housing-engaging portions 318 may be defined by a first side surface $318_{S1}$, a second side surface $318_{S2}$, a proximal end $318_P$, a distal end $318_D$, an upper axial surface $318_U$ and a lower axial surface $318_L$. The distal end $318_D$ of each filter housing-engaging portion 318a-318d of the plurality of filter housing-engaging portions 318 connects the upper axial surface $318_U$ to the lower axial surface $318_L$. The first side surface $318_{S1}$ connects the upper axial surface $318_U$ to the lower axial surface $318_L$. The second side surface $318_{S2}$ connects the upper axial surface $318_U$ to the lower axial surface $318_L$. The first and second side surfaces $318_{S1}$, $318_{S2}$ may each extend in an arcuate manner from and between the proximal and distal ends $318_P$, $318_D$. For example, in some implementations, the first and second side surfaces $318_{S1}$, $318_{S2}$ may each extend in an S-shape from and between the proximal and distal ends $318_P$, $318_D$. In some implementations, the first side surface $318_{S1}$ is substantially parallel to the second side surface $318_{S2}$. Accordingly, the proximal and distal ends $318_P$, $318_D$ of each filter housing-engaging portion 318 may define an angle α therebetween. The angle α may be between one degree and ninety degrees. In some implementations, the angle α may be substantially equal to forty-five degrees. The filter housing-engaging portions 318 can allow a user to more efficiently assemble a filter assembly (e.g., filter assembly 10, filter assembly 100), while also improving the functionality of the filter assembly.

Figure 16:
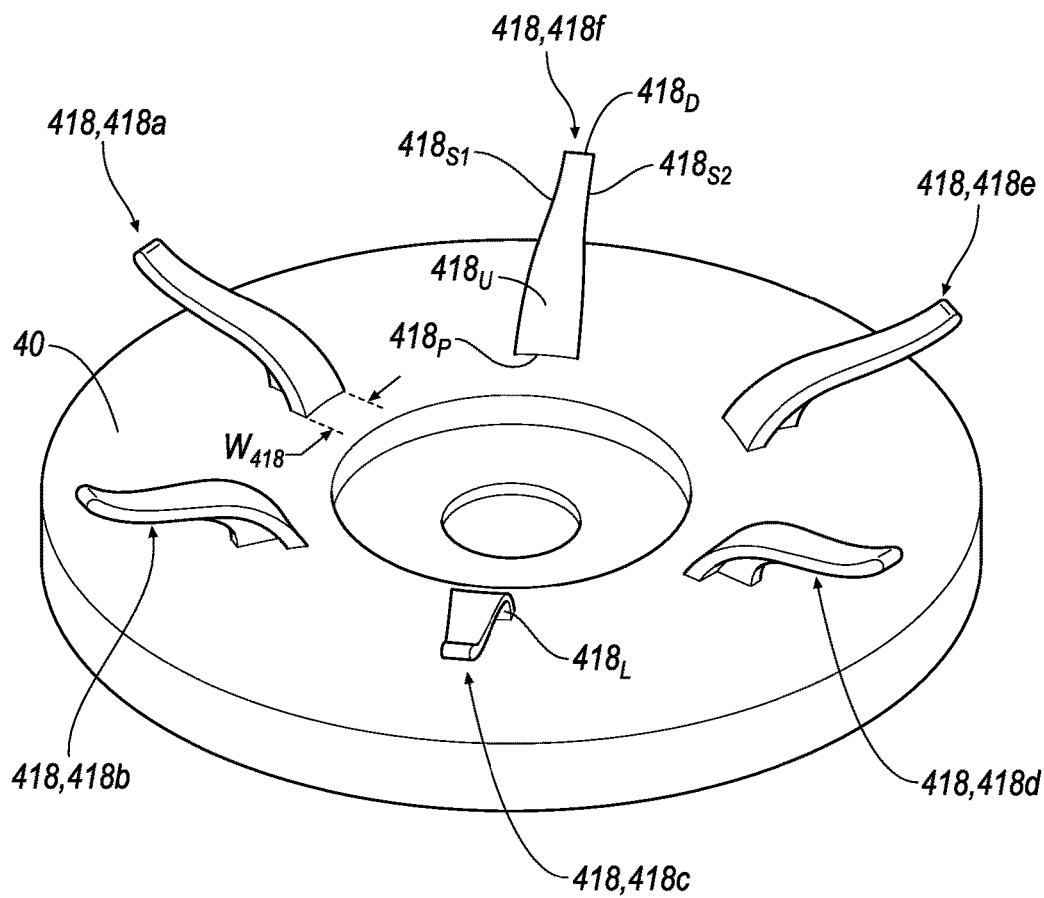
FIG. 16 is a perspective view of an exemplary end cap.

Referring to FIG. 16, another exemplary lower end cap 416 for use with a filter assembly (e.g., filter assembly 10, filter assembly 100) is shown. The structure and function of the lower end cap 416 may be substantially similar to that of the lower end caps 16, 116, 216 and/or 316 apart from any exceptions described below and/or shown in the Figures. Accordingly, the structure and/or function of similar features will not be described again in detail. In addition, like reference numerals are used hereinafter and in the drawings to identify like features.

The lower end cap 416 may include a plurality of filter housing-engaging portions 418. While the lower end cap 416 is generally shown to include six filter housing-engaging portions 418a, 418b, 418c, 418d, 418e, 418f, the lower end cap 416 may include any number of filter housing-engaging portions 418 within the scope of the present disclosure. In some implementations, the lower end cap 416 includes three or more filter housing-engaging portions 418.

Each filter housing-engaging portion 418a-318f of the plurality of filter housing-engaging portions 418 may be defined by a first side surface $418_{S1}$, a second side surface $418_{S2}$, a proximal end $418_P$, a distal end $418_D$, an upper axial surface $418_U$ and a lower axial surface $418_L$. The distal end $418_D$ of each filter housing-engaging portion 418a-418f of the plurality of filter housing-engaging portions 418 connects the upper axial surface $418_U$ to the lower axial surface $418_L$. The first side surface $418_{S1}$ connects the upper axial surface $418_U$ to the lower axial surface $418_L$. The second side surface $418_{S2}$ connects the upper axial surface $418_U$ to the lower axial surface $418_L$. The first and second side surfaces $418_{S1}$, $418_{S2}$ may each extend in an arcuate manner from and between the proximal and distal ends $418_P$, $418_D$. For example, in some implementations, the first and second side surfaces $418_{S1}$, $418_{S2}$ may each extend in an S-shape from and between the proximal and distal ends $418_P$, $418_D$. In particular, a contour of the first side surface $418_{S1}$ may mirror a contour of the second side surface $418_{S2}$ such that a width $W_{418}$ of each filter housing-engaging portion 18a-18f varies from and between the proximal and distal ends $418_P$, $418_D$. For example, the width $W_{418}$ of each filter housing-engaging portion 18a-18f proximate to the proximal end $418_P$ may be greater than the width $W_{418}$ of such filter housing-engaging portion 18a-18f proximate to the distal end $418_D$. The filter housing-engaging portions 418 can allow a user to more efficiently assemble a filter assembly (e.g., filter assembly 10, filter assembly 100), while also improving the functionality of the filter assembly.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An apparatus configured to engage a filter housing and an end of filter media, the apparatus comprising:
   an end cap having a first axial surface, a second axial surface arranged opposite said first axial surface, and an outer radial surface transverse to the first and second axial surfaces, said first axial surface configured to engage the end of the filter media; and
   at least one biasing portion having a proximal end integrally formed with said end cap, and a distal end extending radially outward of the outer radial surface,
   wherein the end cap and the at least one biasing portion are formed from a first material and a second material, and
   wherein the second material forms a core member of the at least one biasing portion and extends along at least a portion of a length of the at least one biasing portion, wherein the first material forms an outer body that is formed over the second material such that the first material defines at least a portion of both of the end cap and the at least one biasing portion.

2. The apparatus of claim 1, wherein the second material further extends from the portion of the length of the at least one biasing portion and into a portion of a thickness of the end cap.

3. The apparatus of claim 1, wherein the end cap includes an annular body, wherein the first axial surface is an upper axial surface, wherein the second axial surface is a lower axial surface.

4. The apparatus of claim 3, wherein the at least one biasing portion integrally extends from the lower axial surface of the end cap.

5. The apparatus of claim 4, wherein the at least one biasing portion includes six biasing portions.

6. The apparatus of claim 5, wherein adjacent biasing portions of the six biasing portions are angularly offset at an angle approximately equal to 60°.

7. The apparatus of claim 4, wherein the at least one biasing portion includes fourteen biasing portions.

8. The apparatus of claim 7, wherein each biasing portion of the fourteen biasing portions is angularly offset from an adjacent biasing portion at an angle approximately equal to 25°.

9. The apparatus of claim 4, wherein the at least one biasing portion is defined by the proximal end, a distal end, an upper axial surface, a lower axial surface, a first side surface and a second side surface.

10. The apparatus of claim 9, wherein the proximal end of the at least one biasing portion integrally extends from the lower axial surface of the end cap.

11. The apparatus of claim 9, wherein the at least one biasing portion is defined by a sinusoidal shape having a concave portion and a convex portion.

12. The apparatus of claim 11, wherein the concave portion includes a proximal end and a distal end, wherein the convex portion includes a proximal end and a distal end, wherein the proximal end of the concave portion is integral with and extends directly away from the lower axial surface of the end cap, wherein the proximal end of the convex portion is integral with and extends directly away from the distal end of the concave portion, wherein the distal end of the convex portion is a terminal end of the at least one biasing portion, wherein the proximal end of the concave portion of the at least one biasing portion is the proximal end of the at least one biasing portion, wherein the distal end of the convex portion is the distal end of the at least one biasing portion.

13. The apparatus of claim 11, wherein at least a portion of the upper axial surface of the at least one biasing portion includes a deflection limiting portion, wherein the deflection limiting portion is defined by a length that extends along at least a portion of a length of the at least one biasing portion.

14. The apparatus of claim 13, wherein the length of each deflection limiting portion extends along at least a portion of a length of the concave portion of the at least one biasing portion.

15. The apparatus of claim 13, wherein the deflection limiting portion is further defined by a width and a thickness, wherein the width of each deflection limiting portion is approximately equal to about half of a width of the at least one biasing portion, wherein the thickness of each deflection limiting portion is defined by a non-constant thickness that tapers along the length of each deflection limiting portion as each deflection limiting portion extends along at least the portion of the length of the concave portion of the at least one biasing portion.

16. The apparatus of claim 15, wherein the thickness of each deflection limiting portion defined by the non-constant thickness includes a maximum thickness near the proximal end of the concave portion of the at least one biasing portion and a minimum thickness near the distal end of the concave portion of the at least one biasing portion.

17. The apparatus of claim 9, wherein a circumferential skirt portion extends axially away from the upper axial surface, wherein the circumferential skirt portion is defined by an outer radial surface, an inner radial surface and an axial surface connecting the outer radial surface of the circumferential skirt portion to the inner radial surface of the circumferential skirt portion.

18. The apparatus of claim 17, wherein the at least one biasing portion includes a plurality of biasing portions circumferentially arranged about the lower axial surface of the end cap, wherein the proximal end of each biasing portion is radially spaced away from an axial center of the end cap at a first radial distance, wherein the distal end of each biasing portion is radially spaced away from the axial center of the end cap at a second radial distance, wherein the second radial distance extends radially beyond the outer radial surface of the circumferential skirt portion.

19. The apparatus of claim 9, wherein the proximal end of the at least one biasing portion integrally extends from a ring portion that integrally extends from the lower axial surface of the end cap.

20. The apparatus of claim 19, wherein the first side surface and the second side surface of the at least one biasing portion is defined by a generally arcuate shape such that a first side surface of the at least one biasing portion is connected to a second side surface of an adjacent biasing portion to collectively define a concave surface.

21. The apparatus of claim 1, wherein the end cap is defined by a thickness extending between the first axial surface and the second axial surface.

22. The apparatus of claim 21, wherein the end cap does not form a passage extending through the thickness extending between the first axial surface and the second axial surface.

23. The apparatus of claim 1, wherein the second axial surface of the end cap defines an annular-shaped depressed portion that forms an annular-shaped boss extending from the first axial surface of the end cap.

24. The apparatus of claim 23, wherein the second axial surface defines a radial surface disposed radially-outward from said depressed portion.

25. The apparatus of claim 24, wherein the proximal end is disposed radially outward from the depressed portion and radially inward from the radial surface.

26. The apparatus of claim 1, wherein the outer radial surface defines an outermost radial surface of the endcap, and wherein the distal end is disposed radially outward of the outermost radial surface.

27. An apparatus configured to engage a filter housing and an end of filter media, the apparatus comprising:
  an end cap having a first axial surface, a second axial surface arranged opposite said first axial surface, and an outer radial surface transverse to the first and second axial surfaces, said first axial surface configured to engage the end of the filter media; and
  at least one biasing portion having a proximal end integrally formed with said end cap, and a distal end extending radially outward of the outer radial surface,
  wherein the end cap includes an annular body, wherein the first axial surface is an upper axial surface, wherein the second axial surface is a lower axial surface,
  wherein the at leak one biasing portion integrally extends from the lower axial surface of the end cap,
  wherein the at least one biasing portion is defined by the proximal end, a distal end, an upper axial surface, a lower axial surface, a first side surface and a second side surface, wherein the at least one biasing portion is defined by a sinusoidal shape having a concave portion and a convex portion, and wherein at least a portion of the upper axial surface of the at least one biasing portion includes a deflection limiting portion, wherein the deflection limiting portion is defined by a length that extends along at least a portion of a length of the at least one biasing portion.

28. The apparatus of claim 27, wherein the length of each deflection limiting portion extends along at least a portion of a length of the concave portion of the at least one biasing portion.

29. The apparatus of claim 27, wherein the deflection limiting portion is further defined by a width and a thickness, wherein the width of each deflection limiting portion is approximately equal to about half of a width of the at least one biasing portion, wherein the thickness of each deflection limiting portion is defined by a non-constant thickness that tapers along the length of each deflection limiting portion as each deflection limiting portion extends along at least the portion of the length of the concave portion of the at least one biasing portion.

30. The apparatus of claim 29, wherein the thickness of each deflection limiting poi ion defined by the non-constant thickness includes a maximum thickness near the proximal end of the concave portion of the at least one biasing portion and a minimum thickness near the distal end of the concave portion of the at least one biasing portion.

* * * * *